US011570545B2

(12) United States Patent
Enamito et al.

(10) Patent No.: US 11,570,545 B2
(45) Date of Patent: Jan. 31, 2023

(54) ACOUSTIC INSPECTION APPARATUS AND ACOUSTIC INSPECTION METHOD

(71) Applicant: KABUSHIKI KAISHA TOSHIBA, Tokyo (JP)

(72) Inventors: Akihiko Enamito, Kawasaki (JP); Osamu Nishimura, Kawasaki (JP); Tatsuhiko Goto, Kawasaki (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/463,436

(22) Filed: Aug. 31, 2021

(65) Prior Publication Data
US 2022/0150620 A1    May 12, 2022

(30) Foreign Application Priority Data
Nov. 12, 2020    (JP) .............................. JP2020-188628

(51) Int. Cl.
*H04R 1/40* (2006.01)
*H04R 1/28* (2006.01)
(Continued)

(52) U.S. Cl.
CPC ............. *H04R 1/406* (2013.01); *H04R 1/245* (2013.01); *H04R 1/2811* (2013.01); *H04R 3/005* (2013.01)

(58) Field of Classification Search
CPC ...... H04R 1/406; H04R 1/245; H04R 1/2811; H04R 3/005
(Continued)

(56) References Cited

U.S. PATENT DOCUMENTS

| 4,622,845 A | 11/1986 | Ryan et al. |
| 5,040,156 A | 8/1991 | Foller |

(Continued)

FOREIGN PATENT DOCUMENTS

| JP | WO 85/04563 A1 | 10/1985 |
| JP | 61-501822 A | 6/1986 |

(Continued)

OTHER PUBLICATIONS

Yoshihiro Hirao, et al., "Development of a Hand-held Sensor-probe for Machine Fault Sound Detection Using Surface Intensity Measurements", The Japan Society of Mechanical Engineers, Proceedings of Symposium on Evaluation and Diagnosis, vol. 1, 2002, 14 pages (with English Translation).

(Continued)

Primary Examiner — William A Jerez Lora
(74) Attorney, Agent, or Firm — Oblon, McClelland, Maier & Neustadt, L.L.P.

(57) ABSTRACT

An acoustic inspection apparatus includes a vibration sound source, a microphone group, and a processor. The vibration sound source emits a vibration sound to an inspection target object. The microphone group includes a first microphone arranged near the inspection target object and a second microphone arranged to have an interval with respect to the first microphone. The processor calculates a first impulse response between the first and second microphones, denoises a component corresponding to the vibration sound from the first impulse response, converts, into a frequency characteristic, a second impulse response obtained from the first impulse response, calculates acoustic energy between the first and second microphones based on the frequency characteristic, and determines an abnormal state of the inspection target object based on the acoustic energy.

9 Claims, 16 Drawing Sheets

(51) Int. Cl.
*H04R 1/24* (2006.01)
*H04R 3/00* (2006.01)

(58) Field of Classification Search
USPC .................................................... 381/91, 92
See application file for complete search history.

(56) References Cited

U.S. PATENT DOCUMENTS

| | | | |
|---|---|---|---|
| 5,285,687 A | 2/1994 | Ringel et al. | |
| 5,510,765 A | 4/1996 | Madau | |
| 5,828,012 A | 10/1998 | Repolle et al. | |
| 11,067,546 B2 | 7/2021 | Enamito | |
| 2002/0030421 A1 | 3/2002 | Orten | |
| 2002/0059831 A1 | 5/2002 | Naudet et al. | |
| 2004/0003663 A1 | 1/2004 | Dibos et al. | |
| 2004/0006283 A1 | 1/2004 | Harrison et al. | |
| 2004/0025593 A1 | 2/2004 | Hashimoto et al. | |
| 2006/0009970 A1 | 1/2006 | Harton et al. | |
| 2006/0088176 A1 | 4/2006 | Werner, Jr. | |
| 2006/0210090 A1 | 9/2006 | Shennib | |
| 2007/0041273 A1 | 2/2007 | Shertukde et al. | |
| 2008/0168993 A1 | 7/2008 | Hong et al. | |
| 2008/0190217 A1 | 8/2008 | Laurent et al. | |
| 2009/0045804 A1 | 2/2009 | Durling et al. | |
| 2012/0278070 A1* | 11/2012 | Herve | H04R 3/005 704/226 |
| 2014/0286501 A1 | 9/2014 | Enamito et al. | |
| 2017/0032519 A1* | 2/2017 | Thornton | G06T 7/11 |
| 2019/0247012 A1* | 8/2019 | Belanger | A61B 8/54 |
| 2020/0264305 A1* | 8/2020 | Douthat | G01S 15/899 |
| 2021/0304785 A1* | 9/2021 | Ninomiya | G10L 25/51 |

FOREIGN PATENT DOCUMENTS

| | | |
|---|---|---|
| JP | 61-2581 47 A | 11/1986 |
| JP | 62-828 A | 1/1987 |
| JP | WO 89/05677 A2 | 6/1989 |
| JP | 2-205748 A | 8/1990 |
| JP | 2-205749 A | 8/1990 |
| JP | 3-051782 A | 3/1991 |
| JP | 3-228097 A | 10/1991 |
| JP | 4-503863 A | 7/1992 |
| JP | 4-320958 A | 11/1992 |
| JP | 4-506755 A | 11/1992 |
| JP | 6-167385 A | 6/1994 |
| JP | 6-258194 A | 9/1994 |
| JP | 6-339445 A | 12/1994 |
| JP | 6-350486 A | 12/1994 |
| JP | 7-136044 A | 5/1995 |
| JP | 7-261834 A | 10/1995 |
| JP | 8-1076 A | 1/1996 |
| JP | 9-229758 A | 9/1997 |
| JP | WO 2002/040959 A1 | 5/2002 |
| JP | 2002-195876 A | 7/2002 |
| JP | 2002-195917 A | 7/2002 |
| JP | 2002-323371 A | 11/2002 |
| JP | 2003-14711 A | 1/2003 |
| JP | 2003-510113 A | 3/2003 |
| JP | 2004-500951 A | 1/2004 |
| JP | 2005-506549 A | 3/2005 |
| JP | 2005-124031 A | 5/2005 |
| JP | 2005-124032 A | 5/2005 |
| JP | 2005-331525 A | 12/2005 |
| JP | 2005-338105 A | 12/2005 |
| JP | 2006-10709 A | 1/2006 |
| JP | 2006-17741 A | 1/2006 |
| JP | 2006-17753 A | 1/2006 |
| JP | 2006-510391 A | 3/2006 |
| JP | 2006-170674 A | 6/2006 |
| JP | 2007-51952 A | 3/2007 |
| JP | 2007-137157 A | 6/2007 |
| JP | 2007-184952 A | 7/2007 |
| JP | 2007-208549 A | 8/2007 |
| JP | 2007-286595 A | 11/2007 |
| JP | 2008-505356 A | 2/2008 |
| JP | 2008-518512 A | 5/2008 |
| JP | 2008-164490 A | 7/2008 |
| JP | 2008-173407 A | 7/2008 |
| JP | 2008-533482 A | 8/2008 |
| JP | 2008-292829 A | 12/2008 |
| JP | 2008-546482 A | 12/2008 |
| JP | 2009-47694 A | 3/2009 |
| JP | 2009-284097 A | 12/2009 |
| JP | 2012-107918 A | 6/2012 |
| JP | 5242313 B2 | 7/2013 |
| JP | 2013-253831 A | 12/2013 |
| JP | 2014-52275 A | 3/2014 |
| JP | 6114587 B2 | 4/2017 |
| JP | 2020-41 832 A | 3/2020 |
| JP | 2020-153693 A | 9/2020 |

OTHER PUBLICATIONS

Hideo Suzuki, "Diagnosis by acoustic and vibration methods", Noise control, vol. 22, No. 5, 1998, 14 pages (with English Translation).

Tsunemi Sugimoto, et al., "Research and development of non-contact acoustic exploration method for non-destructive inspection", Technology R & D results report that contributes to improving the quality of road policy, No.22-3, 2014, 179 pages (with English Translation).

* cited by examiner

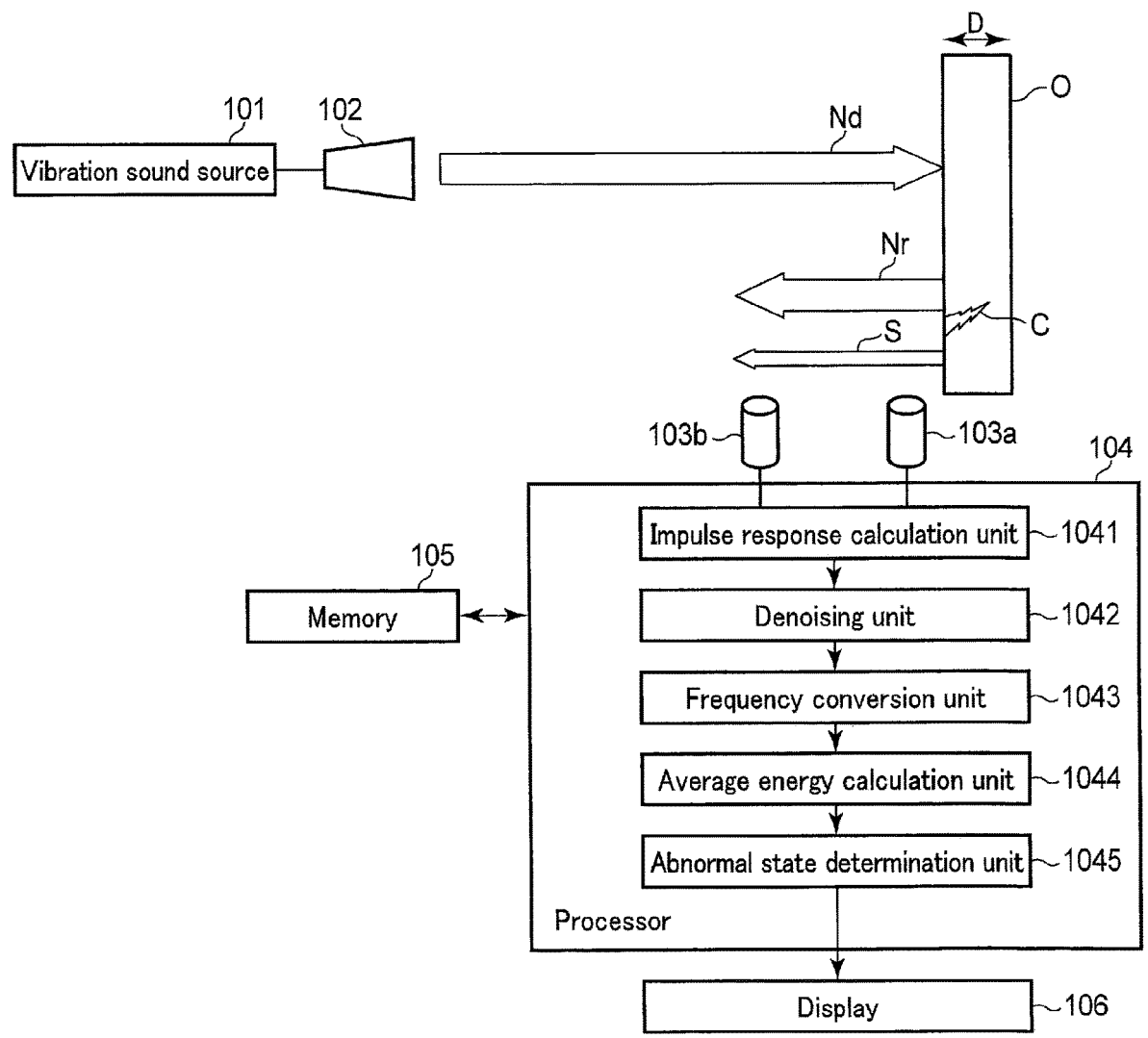
F I G. 1

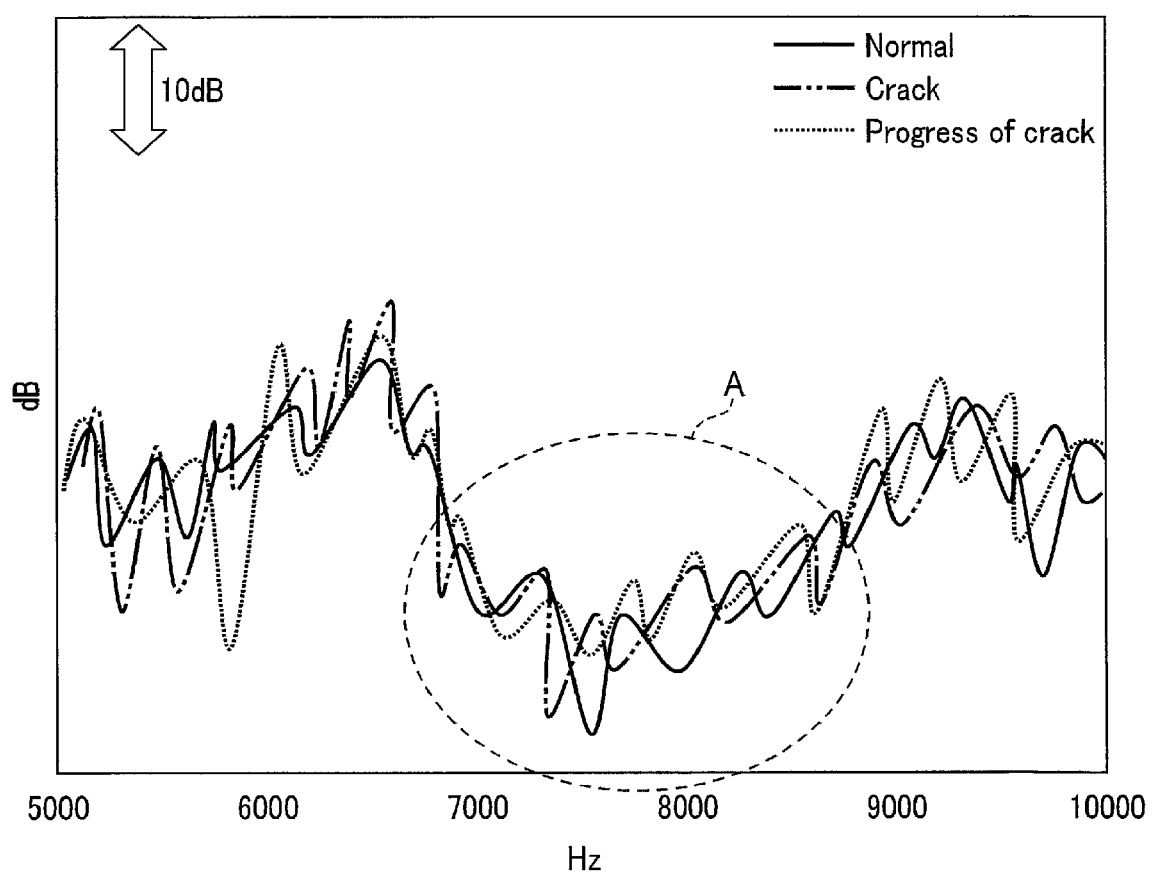
F I G. 10A

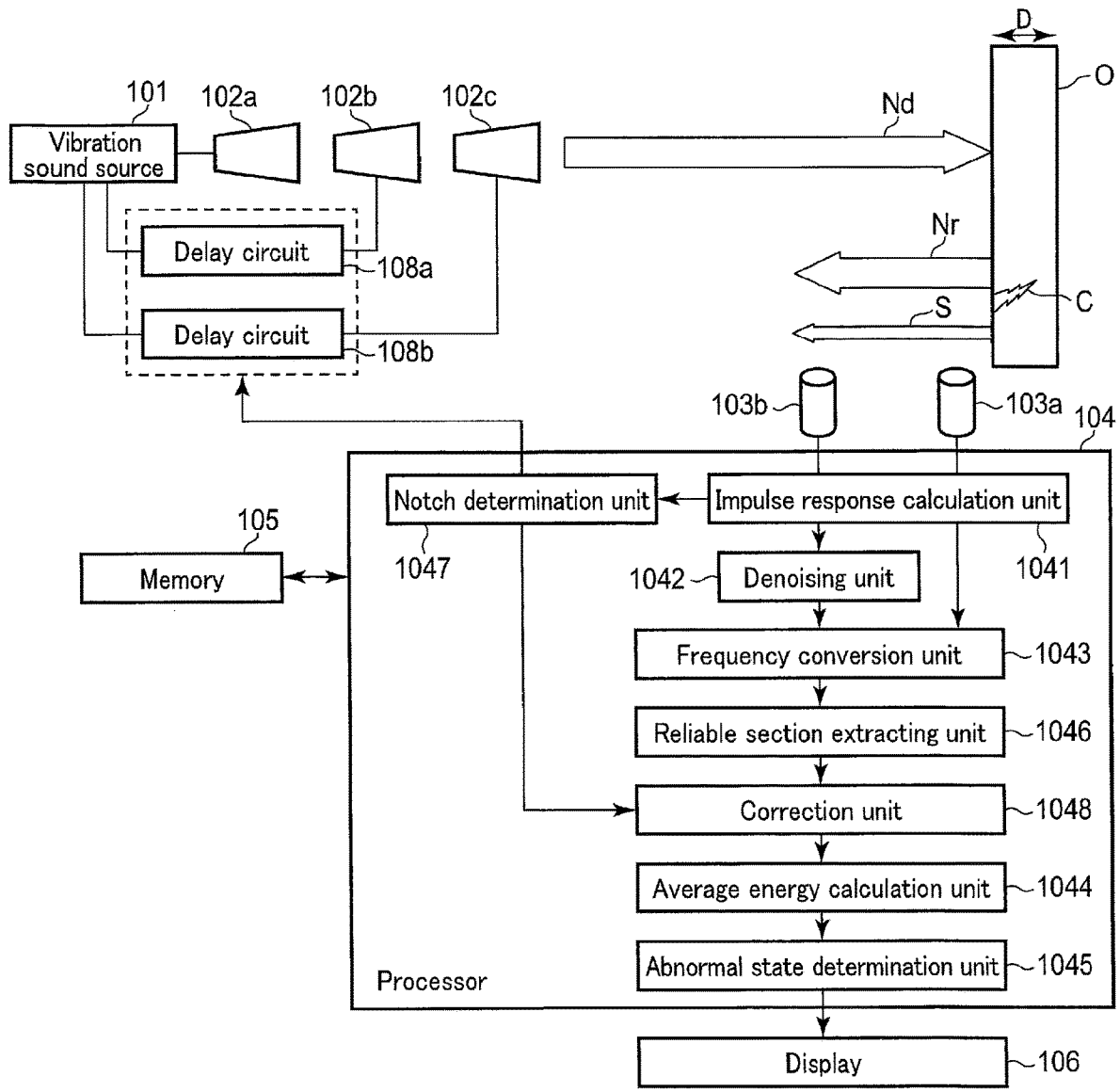
F I G. 13

ACOUSTIC INSPECTION APPARATUS AND ACOUSTIC INSPECTION METHOD

CROSS-REFERENCE TO RELATED APPLICATIONS

This application is based upon and claims the benefit of priority from the Japanese Patent Application No. 2020-188628, filed Nov. 12, 2020, the entire contents of which are incorporated herein by reference.

FIELD

Embodiments described herein relate generally to an acoustic inspection apparatus and an acoustic inspection method.

BACKGROUND

There has been proposed a technique of nondestructively inspecting an abnormal state of an inspection target object using an acoustic wave. In this technique, an abnormal state is inspected by emitting a vibration sound to an inspection target object, and collecting a radiated sound from the inspection target object.

BRIEF DESCRIPTION OF THE DRAWINGS

FIG. 1 is a view showing an example of the arrangement of an acoustic inspection apparatus according to the first embodiment;

FIG. 10A is a graph showing the actual measurement result of the frequency characteristic when the vibration sound is denoised in a given time width based on the collected radiated sound;

FIG. 13 is a view showing an example of the arrangement of an acoustic inspection apparatus according to the third embodiment;

DETAILED DESCRIPTION

Figure 2:
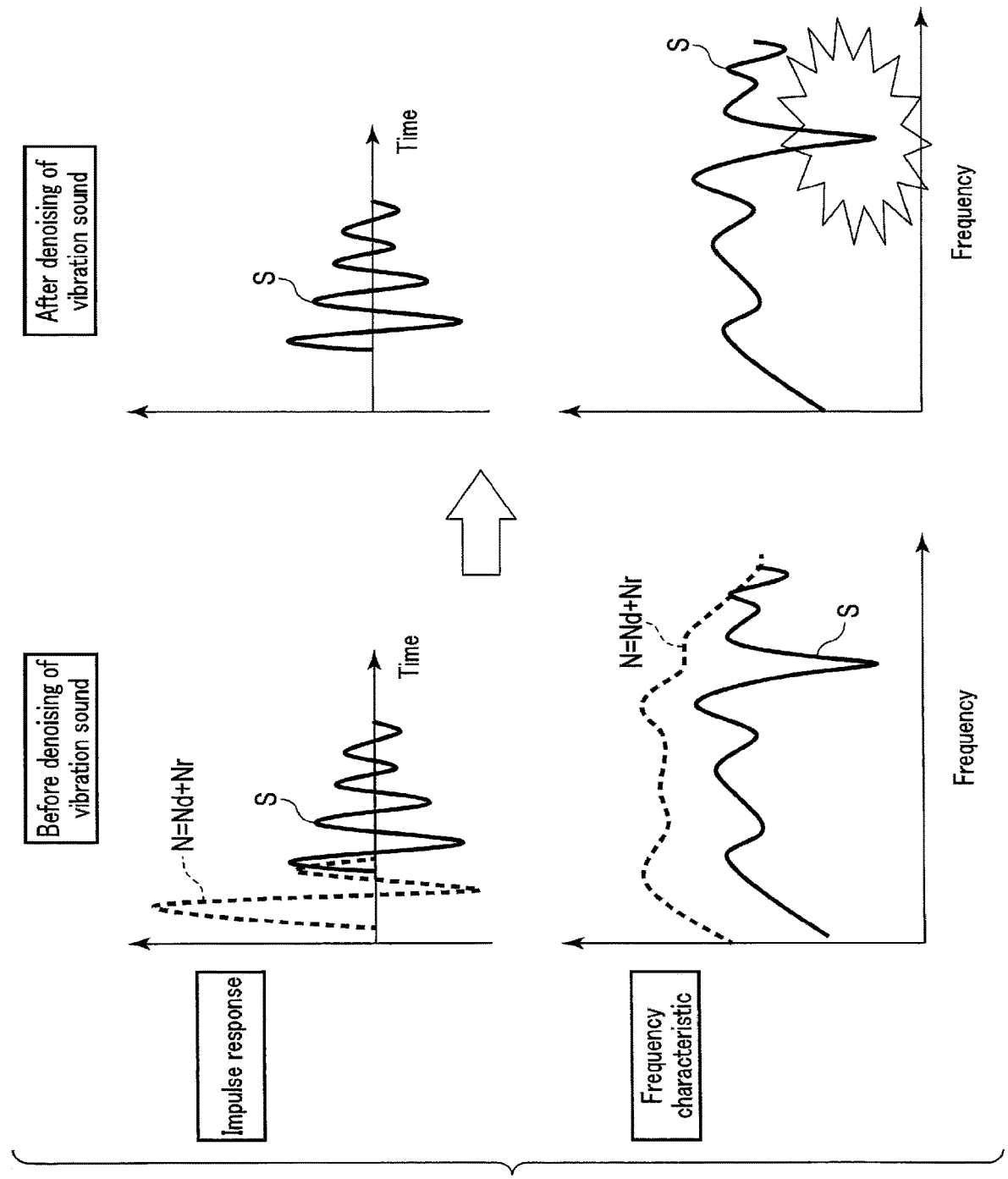
FIG. 2 is a view showing each of impulse responses and frequency characteristics before and after denoising of a vibration sound.

In general, according to one embodiment, an acoustic inspection apparatus includes a vibration sound source, a microphone group, and a processor. The vibration sound source emits a vibration sound to an inspection target object from at least one speaker. The microphone group includes a first microphone arranged near the inspection target object and configured to collect a radiated sound from the inspection target object, and at least one second microphone arranged to have an interval in an emission direction of the vibration sound with respect to the first microphone and configured to collect a the radiated sound from the inspection target object. The processor includes hardware and is configured to calculate a first impulse response between the first microphone and the second microphone based on a first sound pressure level collected via the first microphone and a second sound pressure level collected via the second microphone, denoise a component corresponding to the vibration sound from the first impulse response, convert, into a frequency characteristic, a second impulse response obtained by denoising the component corresponding to the vibration sound from the first impulse response, calculate acoustic energy between the first microphone and the second microphone based on the frequency characteristic, and determine presence/absence of an abnormal state of the inspection target object based on the acoustic energy.

First Embodiment

An embodiment will be described below with reference to the accompanying drawings. FIG. 1 is a view showing an example of the arrangement of an acoustic inspection apparatus according to the first embodiment. The acoustic inspection apparatus according to the first embodiment includes a vibration sound source 101, a speaker 102, a microphone group, a processor 104, a memory 105, and a display 106. This acoustic inspection apparatus inspects the presence/absence of an abnormal state in an inspection target object O by emitting a vibration sound to the inspection target object O and collecting a radiated sound from the inspection target object O. The abnormal state of the inspection target object O is, for example, a crack C occurring in the inspection target object O.

The vibration sound source 101 is a sound source that generates an acoustic vibration signal for generating a vibration sound to be emitted to the inspection target object O. The vibration sound may be, for example, a hammering sound at one point. The acoustic vibration signal may be generated by an arbitrary method.

The speaker 102 is arranged to face the inspection target object O, and emits a vibration sound to the inspection target object O in accordance with the acoustic vibration signal input from the vibration sound source 101. The vibration sound vibrates the inspection target object O in a D direction as a whole, and a radiated sound is radiated from the inspection target object O along with the vibration.

The microphone group includes at least two microphones arranged to have an interval in the emission direction of the vibration sound. A first microphone 103a is a reference microphone arranged near the inspection target object O, for example, at a position of 2.5 cm from the inspection target object O. A second microphone 103b is a microphone arranged to have an interval with respect to the first microphone 103a. Each of the first microphone 103a and the second microphone 103b collects the radiated sound from the inspection target object O, converts the collected radiated sound into an electrical signal, and outputs the electrical signal to the processor 104.

The processor 104 includes, a digital signal processor such as a CPU, an ASIC, an FPGA, or a DSP, and performs various processes associated with the acoustic inspection apparatus. The processor 104 may be formed by a single CPU or the like or by a plurality of CPUs or the like. The processor 104 operates as an impulse response calculation unit 1041, a denoising unit 1042, a frequency conversion unit 1043, an average energy calculation unit 1044, and an abnormal state determination unit 1045 by executing, for example, an acoustic inspection program stored in the memory 105.

The impulse response calculation unit 1041 samples each of an acoustic signal collected via the first microphone 103a and an acoustic signal collected via the second microphone 103b in accordance with a sampling frequency. The impulse response calculation unit 1041 calculates an impulse response between the first microphone 103a and the second microphone 103b based on the first sound pressure level collected via the first microphone 103a and the second sound pressure level based on the acoustic signal collected via the second microphone 103b. For example, the impulse response calculation unit 1041 calculates the impulse response by adaptive identification processing using a convolution operation.

The denoising unit 1042 extracts a component of a vibration radiated sound S along with the vibration of the crack C of the inspection target object O by denoising a component of a vibration sound N from the impulse response calculated by the impulse response calculation unit 1041. FIG. 2 is a view showing each of impulse responses and frequency characteristics before and after denoising of the vibration sound. As shown in FIG. 2, the impulse response collected by the impulse response calculation unit 1041 includes the component of the vibration sound indicated by a broken line and the component of the vibration radiated sound indicated by a solid line. Therefore, a frequency characteristic calculated based on the impulse response also includes both the frequency characteristic of the vibration sound and the frequency characteristic of the vibration radiated sound. The vibration radiated sound along with the vibration of the crack C of the inspection target object O is smaller than the vibration sound. That is, the vibration sound is necessary to excite the vibration radiated sound but is noise unnecessary to determine the abnormal state of the inspection target object O. Thus, the denoising unit 1042 denoises the component of the vibration sound N as noise. The vibration sound N collected by the first microphone 103a and the second microphone 103b includes a component of a direct wave Nd from the speaker 102 and a component of a reflected wave Nr from the inspection target object O. The component of the direct wave Nd can be denoised by setting of the first microphone 103a or adaptive identification processing. On the other hand, the component of the reflected wave Nr from the inspection target object O can be denoised by, for example, detecting the maximum peak of the impulse response, and denoising a component in a predetermined time width including the maximum peak of the impulse response, that is, a component for the sampling number corresponding to the time width. The denoising unit 1042 performs processing of denoising the component in the predetermined time width including the maximum peak of the impulse response. As indicated by the impulse response in FIG. 2, reverberation of the vibration radiated sound S is longer than the vibration sound N (=Nd+Nr). Therefore, by denoising the component in the predetermined time width from the impulse response, the frequency characteristic calculated based on the impulse response output from the denoising unit 1042 includes only the frequency characteristic of the vibration radiated sound S. As will be described later, since the frequency characteristic of the vibration radiated sound is different between the presence of the abnormal state and the absence of the abnormal state, the presence/absence of the abnormal state can be determined based on the difference.

The frequency conversion unit 1043 converts the impulse response output from the denoising unit 1042 into the frequency characteristic. For example, the frequency conversion unit 1043 converts the impulse response into the frequency characteristic using FFT (Fast Fourier Transformation).

The average energy calculation unit 1044 calculates the average acoustic energy between the first microphone 103a and the second microphone 103b based on the gain of the entire region in the frequency characteristic output from the frequency conversion unit 1043.

Based on the average acoustic energy calculated by the average energy calculation unit 1044, the abnormal state determination unit 1045 determines the presence/absence of an abnormal state in the inspection target object O and the degree of progress of the abnormal state if it exists. For example, the abnormal state determination unit 1045 stores an average acoustic energy threshold when there exists the abnormal state in an inspection target object similar to the inspection target object O. The abnormal state determination unit 1045 determines the presence/absence of the abnormal state by comparing, with the threshold, the average acoustic energy calculated by the average energy calculation unit 1044. Similarly, the abnormal state determination unit 1045 stores the average acoustic energy threshold when the abnormal state progresses in an inspection target object similar to the inspection target object O. The abnormal state determination unit 1045 determines the degree of progress of the abnormal state by comparing, with the threshold, the average acoustic energy calculated by the average energy calculation unit 1044.

The memory 105 includes a ROM and a RAM. The ROM stores various programs such as an activation program of the acoustic inspection apparatus and the acoustic inspection program to be executed by the processor 104. The RAM is used as a work memory when the processor 104 performs various calculation operations and the like.

The display 106 is a display such as a liquid crystal display or an organic EL display, and displays various kinds of images. For example, the display 106 displays the determination result of the presence/absence of the abnormal state and the degree of progress of the abnormal state by the abnormal state determination unit 1045.

Figure 3:
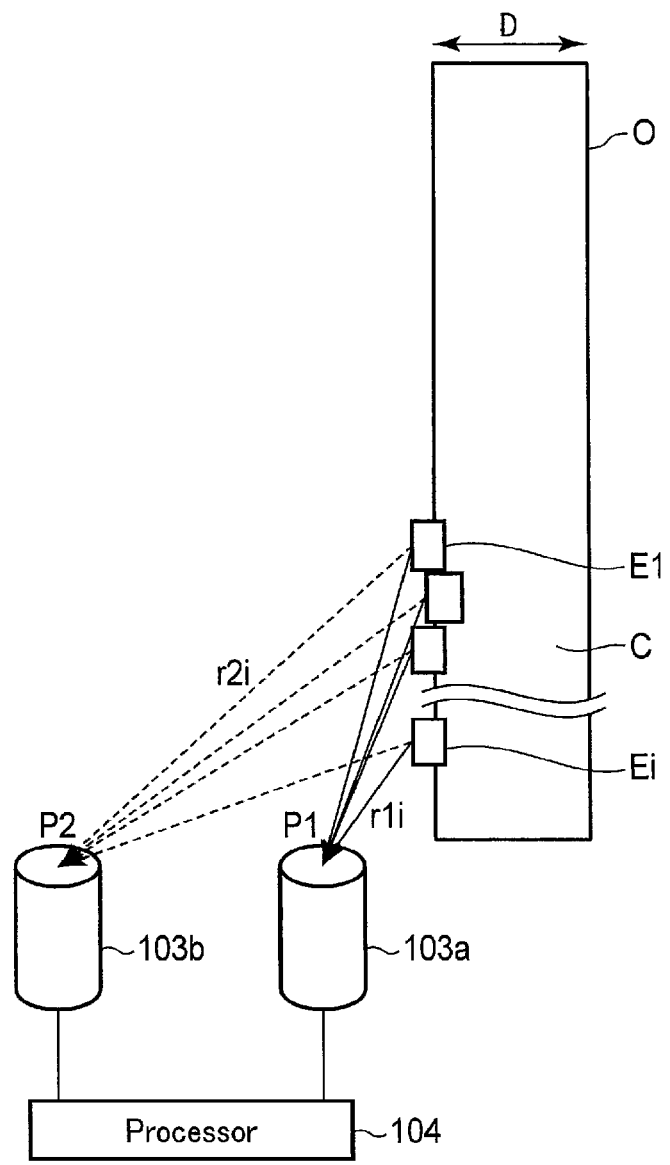
FIG. 3 is a view for explaining the operation principle of the acoustic inspection apparatus.

The operation of the acoustic inspection apparatus according to the first embodiment will be described below. The operation principle of the acoustic inspection apparatus will first be described. FIG. 3 is a view for explaining the operation principle of the acoustic inspection apparatus. When a vibration sound is emitted to the inspection target object O, the inspection target object O vibrates in the D direction as a whole. At this time, a portion of the inspection target object O where there is no abnormal state, for example, there is no crack C uniformly vibrates in the D direction. On the other hand, with respect to a portion of the crack C, as shown in FIG. 3, a portion of the crack C and its periphery have a local, discontinuous, and asymmetrical vibration field unlike mode vibration of the remaining portion by plate resonance. The vibration of the crack C is represented by a model in which many vibration elements Ei (i=1, 2, . . . , N) of several mm are distributed on a two-dimensional flat plate and each vibration element Ei vibrates at a different complex amplitude, as shown in FIG. 3. The acoustic inspection apparatus according to the embodiment detects the radiated sound based on the vibration of such model.

Therefore, the acoustic inspection apparatus according to the first embodiment detects the radiated sound from the inspection target object O by the first microphone 103a and the second microphone 103b as the two microphones arranged to have an interval in the emission direction of the vibration sound, that is, the radiation direction of the radiated sound.

When P1 and P2 represent the sound pressure levels (maximum sound pressure levels) of the radiated sound radiated from the vibration element Ei and detected by the first microphone 103a and the second microphone 103b, respectively, a transfer function G between the first microphone 103a and the second microphone 103b is given by equation (1) below. Furthermore, when r1i represents the distance from the vibration element Ei to the first microphone 103a, r2i represents the distance from the vibration element Ei to the second microphone 103b, and qi represents a volume velocity (=vibration velocity vi of vibration element Ei×area si of vibration element Ei) of the vibration element Ei, the sound pressure levels P1 and P2 are given by equations (2) and (3) below, respectively. In equation (1), * (asterisk) is a symbol representing a complex conjugate.

$$G = \frac{P2 \cdot P1^*}{P1 \cdot P1^*} \quad (1)$$

$$P1 = \sum_{i=1}^{N} \frac{e^{-jkr1i}}{r1i} qi \quad (2)$$

$$P2 = \sum_{i=1}^{N} \frac{e^{-jkr2i}}{r2i} qi \quad (3)$$

Summarizing the relationship among equations (1), (2), and (3), the transfer function G can be given by equation (4) below. In equation (4), $\alpha i$ represents the complex amplitude of the vibration element Ei. When q1 represents the volume velocity of the vibration element E1 at one end of the vibration elements, qi, $\alpha i$, and q1 have a relationship of $qi = \alpha i \times q1$. Furthermore, $\beta 1i$ represents a coefficient based on a propagation path ratio associated with the distance r1i. $\beta 2i$ represents a coefficient based on a propagation path ratio associated with the distance r2i. $\beta 1i$ and $\beta 2i$ have relationships of equations (5) and (6) below, respectively. Furthermore, in equation (4), $\Delta r$ is given by $\Delta r = r21 - r11$. In equation (5), $\Delta r1i$ is given by $\Delta r1i = r1i - r11$. In equation (6), $\Delta r2i$ is given by $\Delta r2i = r2i - r21$.

$$G = \frac{r11}{r21} e^{-jk\Delta r} \frac{1 + \sum_{i=2}^{N} \alpha i \beta 2i}{1 + \sum_{i=2}^{N} \alpha i \beta 1i} \quad (4)$$

$$\beta 1i = \frac{r11}{r1i} e^{-jk\Delta r1i} \quad (5)$$

$$\beta 2i = \frac{r21}{r2i} e^{-jk\Delta r2i} \quad (6)$$

In this example, if the vibration element Ei readily vibrates due to the presence/absence of a crack, a difference in depth, and the like, the volume velocity qi increases accordingly. Therefore, $\alpha i$ increases. Furthermore, depending on the size and progress of the crack, the radiation position also changes and $\beta 1i$ and $\beta 2i$ thus change.

As described above, the transfer function G between the two microphones arranged to have the interval can change in accordance with the vibration radiated sound according to the presence/absence of a crack and the degree of progress of the crack. Therefore, by measuring the transfer function G, the presence/absence of a crack and the degree of progress of the crack can be determined. That is, the acoustic inspection apparatus according to the embodiment is configured to determine the presence/absence of a crack and the degree of progress of the crack using the fact that the presence/absence of the crack and the progress of the crack appear as a change of the transfer function between the microphones by collecting the radiated sound from the vibration element by the two microphones having different intervals. Furthermore, the acoustic inspection apparatus according to the embodiment is configured to extract a component of a weak radiated sound buried in a vibration sound by measuring the transfer function as an impulse response, and denoising the component of the vibration sound from the impulse response.

In FIG. 3, the inspection target object O is the crack C. The acoustic inspection apparatus according to the embodiment can detect reduction of the axial force of a screw or the like based on the principle similar to that of the crack C.

Furthermore, in the embodiment, the two microphones having different intervals collect the radiated sound from the inspection target object O. The change of the transfer function G is larger as the microphone interval is extended.

Therefore, the microphone interval may be extended to an appropriate interval. Furthermore, a plurality of second microphones having different intervals may be arranged.

Figure 4:
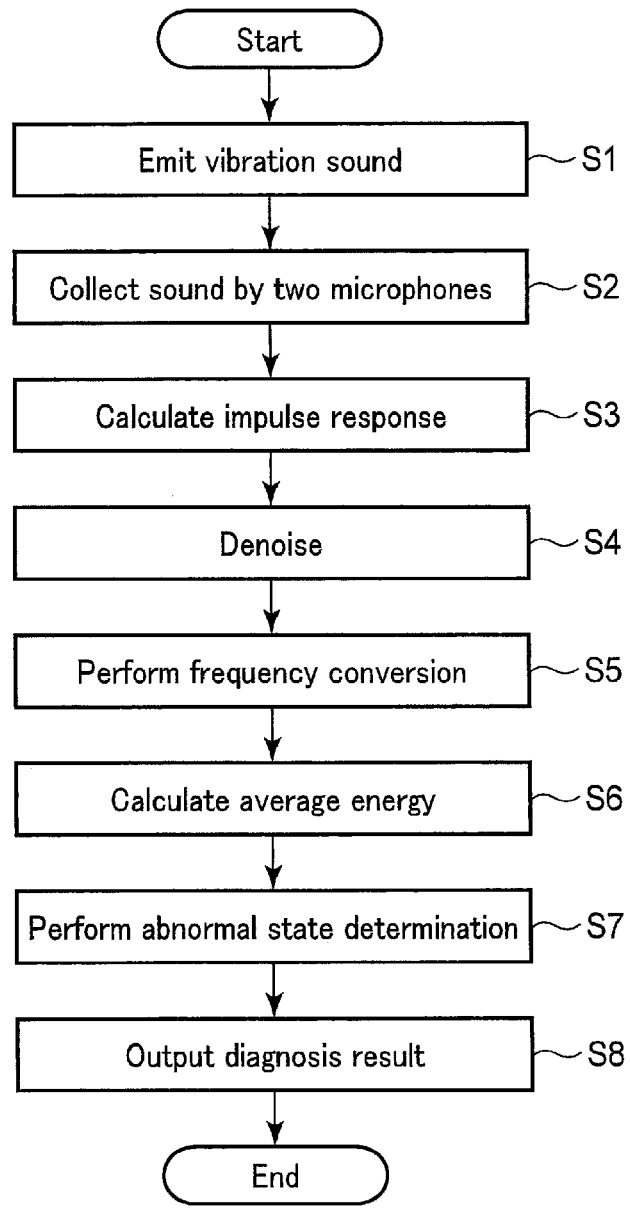
FIG. 4 is a flowchart illustrating the operation of the acoustic inspection apparatus according to the first embodiment.

FIG. 4 is a flowchart illustrating the operation of the acoustic inspection apparatus according to the first embodiment. Processing shown in FIG. 4 is mainly executed by the processor 104.

In step S1, the vibration sound source 101 emits a vibration sound to the inspection target object O.

In step S2, the first microphone 103a and the second microphone 103b collect the sound.

In step S3, the processor 104 calculates an impulse response between the first microphone 103a and the second microphone 103b based on the sound pressure levels of acoustic signals collected by the first microphone 103a and the second microphone 103b.

In step S4, the processor 104 denoises the component of the vibration sound from the calculated impulse response.

In step S5, the processor 104 converts the impulse response, from which the component of the vibration sound has been denoised, into a frequency characteristic by, for example, FFT.

In step S6, the processor 104 calculates the average acoustic energy between the first microphone 103a and the second microphone 103b from the frequency characteristic.

In step S7, the processor 104 determines the presence/absence of an abnormal state in the inspection target object O and the degree of progress of the abnormal state by, for example, comparing the calculated average acoustic energy with the threshold.

In step S8, the processor 104 outputs, as the diagnosis result of the abnormal state, the determination result of the presence/absence of the abnormal state and the degree of progress of the abnormal state to, for example, the display 106.

As described above, according to the embodiment, the acoustic inspection apparatus for inspecting the abnormal state of the inspection target object collects a radiated sound from the inspection target object using the two microphones arranged to have an interval in the emission direction of the vibration sound. This causes the presence/absence of a crack and the progress of the crack to appear as a change of a transfer function between the microphones. Therefore, it is possible to determine the presence/absence of the crack and the degree of progress of the crack with the simple arrangement that uses only the two microphones.

Second Embodiment

Figure 5:
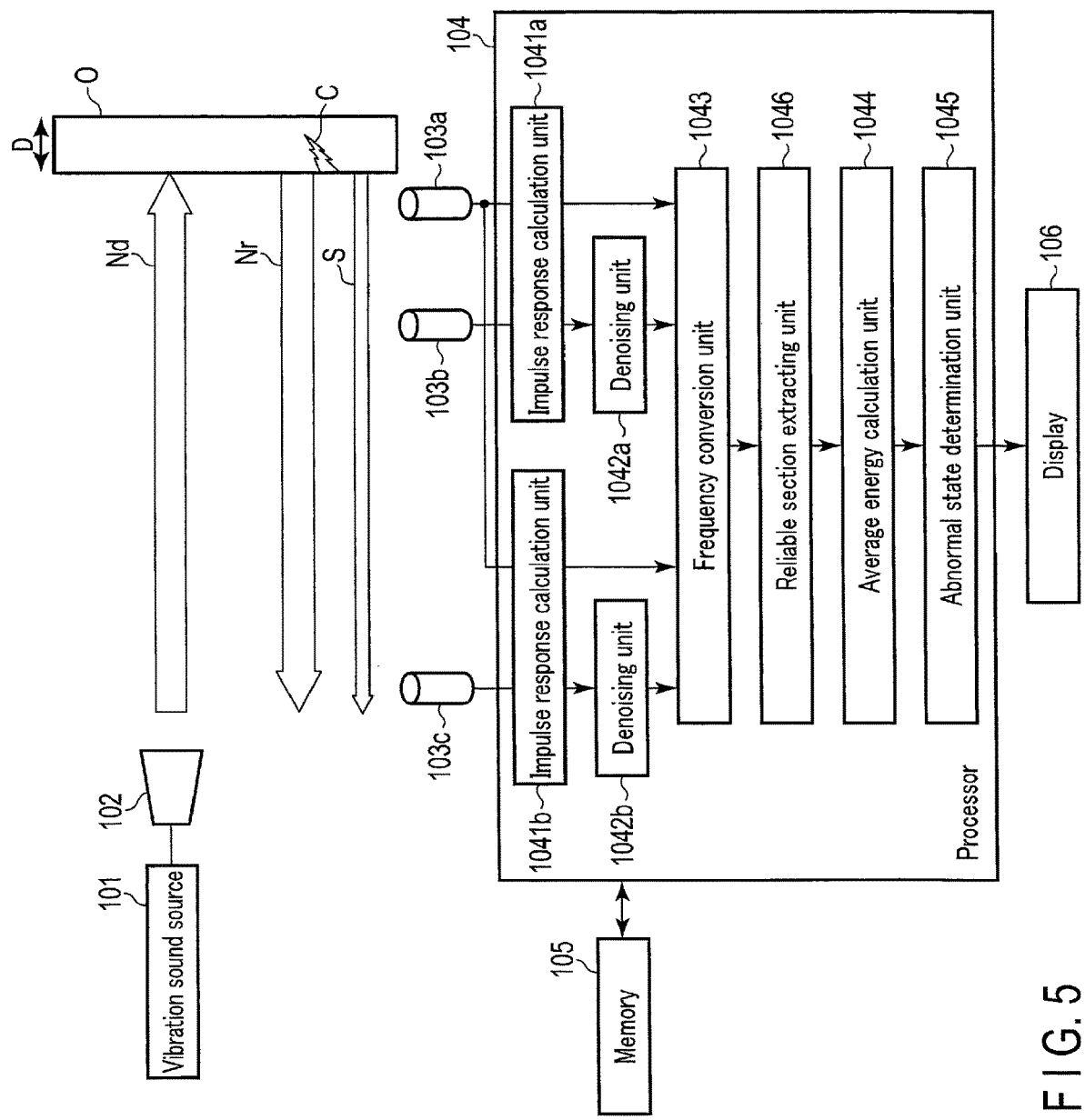
FIG. 5 is a view showing an example of the arrangement of an acoustic inspection apparatus according to the second embodiment.

The second embodiment will be described next. FIG. 5 is a view showing an example of the arrangement of an acoustic inspection apparatus according to the second embodiment. Similar to the first embodiment, the acoustic inspection apparatus according to the second embodiment includes a vibration sound source 101, a speaker 102, a microphone group, a processor 104, a memory 105, and a display 106. The second embodiment will mainly describe portions different from the first embodiment. In the second embodiment, a description of portions similar to those in the first embodiment will be omitted or simplified.

In the second embodiment, the microphone group includes a first microphone 103a and two second microphones 103b and 103c. The first microphone 103a is a reference microphone arranged near an inspection target object O, for example, at a position of 2.5 cm from the inspection target object O. The second microphones 103b and 103c are microphones arranged to have different intervals with respect to the first microphone 103a in the emission direction of a vibration sound, or the radiation direction of a radiated sound. That is, the second microphone 103c is a microphone arranged to have a large interval with respect to the first microphone 103a, as compared to the second microphone 103b. As described above, a change of a transfer function is larger as the microphone interval is extended. Therefore, a change of the transfer function between the first microphone 103a and the second microphone 103c is larger than a change of the transfer function between the first microphone 103a and the second microphone 103b.

The processor 104 according to the second embodiment operates as impulse response calculation units 1041a and 1041b, denoising units 1042a and 1042b, a frequency conversion unit 1043, a reliable section extracting unit 1046, an average energy calculation unit 1044, and an abnormal state determination unit 1045 by executing, for example, an acoustic inspection program stored in the memory 105.

The impulse response calculation unit 1041a calculates an impulse response between the first microphone 103a and the second microphone 103b based on the first sound pressure level based on an acoustic signal collected via the first microphone 103a and the second sound pressure level based on an acoustic signal collected via the second microphone 103b. The impulse response calculation unit 1041b calculates an impulse response between the first microphone 103a and the second microphone 103c based on the first sound pressure level based on the acoustic signal collected via the first microphone 103a and the second sound pressure level based on an acoustic signal collected via the second microphone 103c.

The denoising unit 1042a extracts a component of a vibration radiated sound along with the vibration of a crack C of the inspection target object O by denoising a component of the vibration sound from the impulse response calculated by the impulse response calculation unit 1041a. The denoising unit 1042b extracts a component of a vibration radiated sound along with the vibration of the crack C of the inspection target object O by denoising the component of the vibration sound from the impulse response calculated by the impulse response calculation unit 1041b. That is, the denoising unit 1042a denoises the component of the vibration sound in a denoising time width corresponding to the interval between the first microphone 103a and the second microphone 103b. Furthermore, the denoising unit 1042b denoises the component of the vibration sound in a denoising time width corresponding to the interval between the first microphone 103a and the second microphone 103c. The same denoising method as that of the denoising unit 1042 may be used.

As described in the first embodiment as well, a vibration sound N collected by the microphone includes a component of a direct wave Nd from the speaker 102 and a component of a reflected wave Nr from the inspection target object O. The reflected wave Nr of the vibration sound enters the microphones from the same direction as that of the vibration radiated sound at almost the same timing. That is, the vibration radiated sound and the reflected wave of the vibration sound are mixed in the same time period. Therefore, if the reflected wave of the vibration sound is simply denoised, part of the vibration radiated sound may also be denoised. If part of the vibration radiated sound is unwantedly denoised, the determination accuracy of an abnormal state also degrades.

Figure 6A:
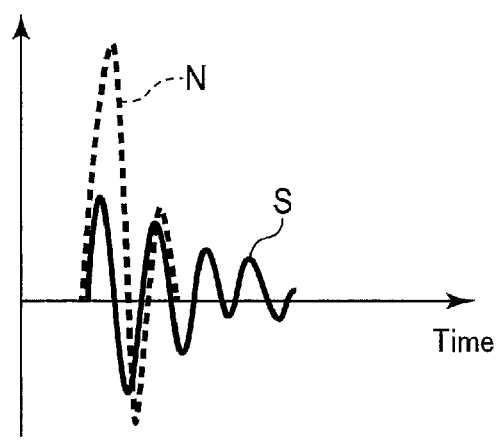
FIG. 6A is a timing chart showing an example of the occurrence timing of a vibration radiated sound.
Figure 6B:
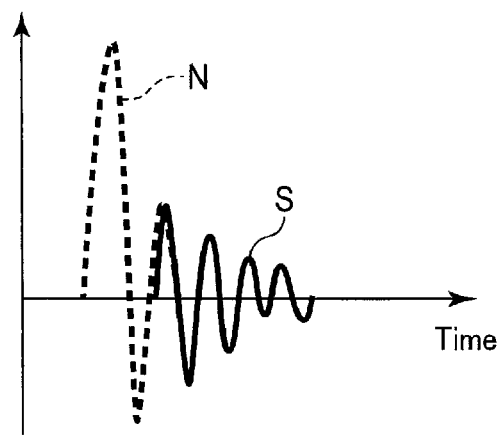
FIG. 6B is a timing chart showing another example of the occurrence timing of a vibration radiated sound.

Furthermore, as shown in FIGS. 6A and 6B, the occurrence timing of a vibration radiated sound can change every time a vibration sound is emitted. Therefore, it is not desirable to uniformly decide a denoising time width. To cope with this, in this embodiment, two denoising units having different denoising time widths corresponding to the microphone intervals are used to denoise the vibration sound.

In the second embodiment, a plurality of second microphones having different microphone intervals are prepared in advance. To the contrary, only one second microphone may be prepared, and inspection may be performed a plurality of times by changing the interval between the first microphone and the one second microphone. In this case, the denoising unit sets the denoising time width in accordance with the microphone interval between the first microphone and the second microphone.

The frequency conversion unit 1043 converts an impulse response output from each of the denoising units 1042a and 1042b into a frequency characteristic. Furthermore, in the second embodiment, the frequency conversion unit 1043 also converts the impulse response calculated by the impulse response calculation unit 1041a and that calculated by the impulse response calculation unit 1041b into frequency characteristics.

The reliable section extracting unit 1046 extracts a reliable section in the frequency characteristic converted by the frequency conversion unit 1043. The reliable section is a band in which denoising by the denoising units 1042a and 1042b is performed with high reliability. In other words, the reliable section is a band in which the component of the vibration radiated sound is not denoised when the denoising units 1042a and 1042b perform denoising.

Figure 7:
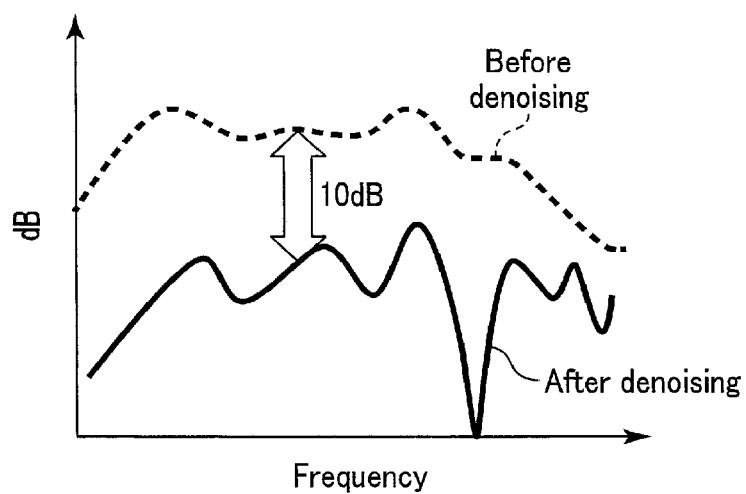
FIG. 7 is a graph showing a concept of extraction of a reliable section.

FIG. 7 is a graph showing a concept of extraction of the reliable section. In the embodiment, the reliable section can be determined by comparing the frequency characteristics before and after denoising of the vibration sound by the denoising unit. A broken line in FIG. 7 indicates the frequency characteristic before denoising. A solid line in FIG. 7 indicates the frequency characteristic after denoising. As described above, the frequency characteristic before denoising includes both the characteristic of the vibration sound (direct wave Nd+reflected wave Nr) and the characteristic of a vibration radiated sound S. To the contrary, the frequency characteristic after denoising includes only the characteristic of the vibration radiated sound S. Therefore, a band in which the decrease amount of the gain after denoising is larger than that before denoising can be said as a band in which the contribution of the vibration radiated sound is small in the frequency characteristic before denoising. That is, in such band, the frequency characteristic before denoising substantially includes only the component of the vibration sound (direct wave Nd+reflected wave Nr). Therefore, in such band, the component of the vibration radiated sound is hardly denoised even after denoising of the vibration sound. In the embodiment, the band in which the difference in gain before and after denoising is 10 dB or more is the reliable section. The reliable section extracting unit 1046 extracts, as the reliable section, each of a band in which the difference in gain between the frequency characteristics before and after denoising by the denoising unit 1042a, which have been converted by the frequency conversion unit 1043, is 10 dB or more and a band in which the difference in gain between the frequency characteristics before and after denoising by the denoising unit 1042b, which have been converted by the frequency conversion unit 1043, is 10 dB or more. Note that the threshold of the difference in gain is not limited to 10 dB.

The average energy calculation unit 1044 calculates each of the average acoustic energy between the first microphone 103a and the second microphone 103b and that between the first microphone 103a and the second microphone 103c based on the gain in the reliable section of the frequency response extracted by the reliable section extracting unit 1046.

Based on the average acoustic energy calculated by the average energy calculation unit 1044, the abnormal state determination unit 1045 determines the presence/absence of an abnormal state in the inspection target object O and the degree of progress of the abnormal state if it exists. The abnormal state determination unit 1045 may perform determination using only one or both of the average acoustic energy between the first microphone 103a and the second microphone 103b and that between the first microphone 103a and the second microphone 103c. If only one average acoustic energy is used, the abnormal state determination unit 1045 may perform determination using the average acoustic energy in the wider reliable section or the higher average acoustic energy.

Figure 8:
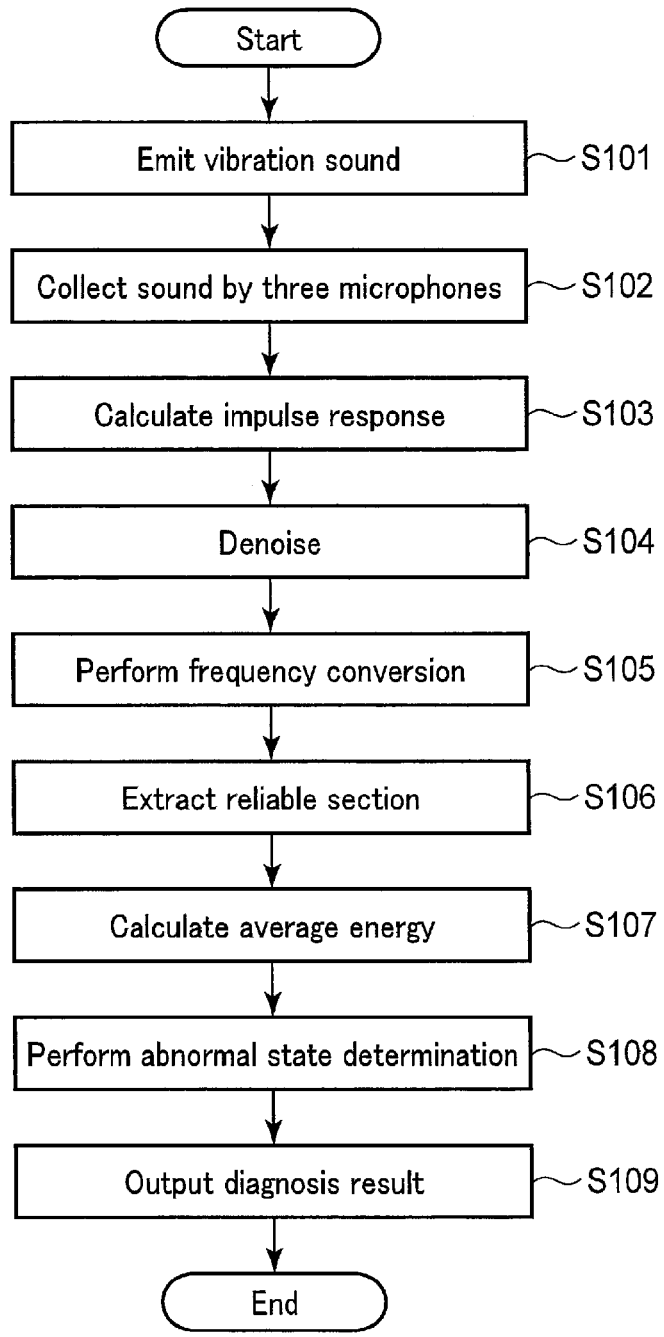
FIG. 8 is a flowchart illustrating the operation of the acoustic inspection apparatus according to the second embodiment.

FIG. 8 is a flowchart illustrating the operation of the acoustic inspection apparatus according to the second embodiment. Processing shown in FIG. 8 is mainly executed by the processor 104.

In step S101, the vibration sound source 101 emits a vibration sound to the inspection target object O.

In step S102, the first microphone 103a and the second microphones 103b and 103c collect the sound.

In step S103, the processor 104 calculates an impulse response between the first microphone 103a and the second microphone 103b based on the sound pressure levels of acoustic signals collected by the first microphone 103a and the second microphone 103b. Furthermore, the processor 104 calculates an impulse response between the first microphone 103a and the second microphone 103c based on the sound pressure levels of acoustic signals collected by the first microphone 103a and the second microphone 103c.

In step S104, the processor 104 denoises the component of the vibration sound from each calculated impulse response.

In step S105, the processor 104 converts each impulse response, from which the component of the vibration sound has been denoised, into a frequency characteristic by, for example, FFT. Furthermore, the processor 104 converts each impulse response before denoising of the component of the vibration sound into a frequency characteristic.

In step S106, the processor 104 extracts a reliable section by comparing the frequency characteristics before and after denoising.

In step S107, the processor 104 calculates the average acoustic energy between the first microphone 103a and the second microphone 103b using the gain in the reliable section of the frequency characteristic of the impulse response between the first microphone 103a and the second microphone 103b. Furthermore, the processor 104 calculates the average acoustic energy between the first microphone 103a and the second microphone 103c using the gain in the reliable section of the frequency characteristic of the impulse response between the first microphone 103a and the second microphone 103c.

In step S108, the processor 104 determines the presence/absence of the abnormal state in the inspection target object O and the degree of progress of the abnormal state by comparing the calculated average acoustic energy with the threshold.

In step S109, the processor 104 outputs, as the diagnosis result of the abnormal state, the determination result of the presence/absence of the abnormal state and the degree of progress of the abnormal state to, for example, the display 106.

As described above, according to the second embodiment, a microphone having an extended microphone interval is prepared in advance, thereby making it possible to acquire more information of a vibration radiated sound. Furthermore, by denoising the vibration sound in the denoising time width corresponding to the microphone interval, only the vibration sound can selectively be denoised even if the occurrence timing of the vibration radiated sound is different. As a result, the accuracy of denoising is improved and the determination accuracy of the abnormal state is also improved. Furthermore, the reliable section is extracted by comparing the frequency characteristics before and after denoising. This can confirm whether denoising is performed with high reliability. As a result, the accuracy of denoising is improved and the determination accuracy of the abnormal state is also improved.

Figure 9:
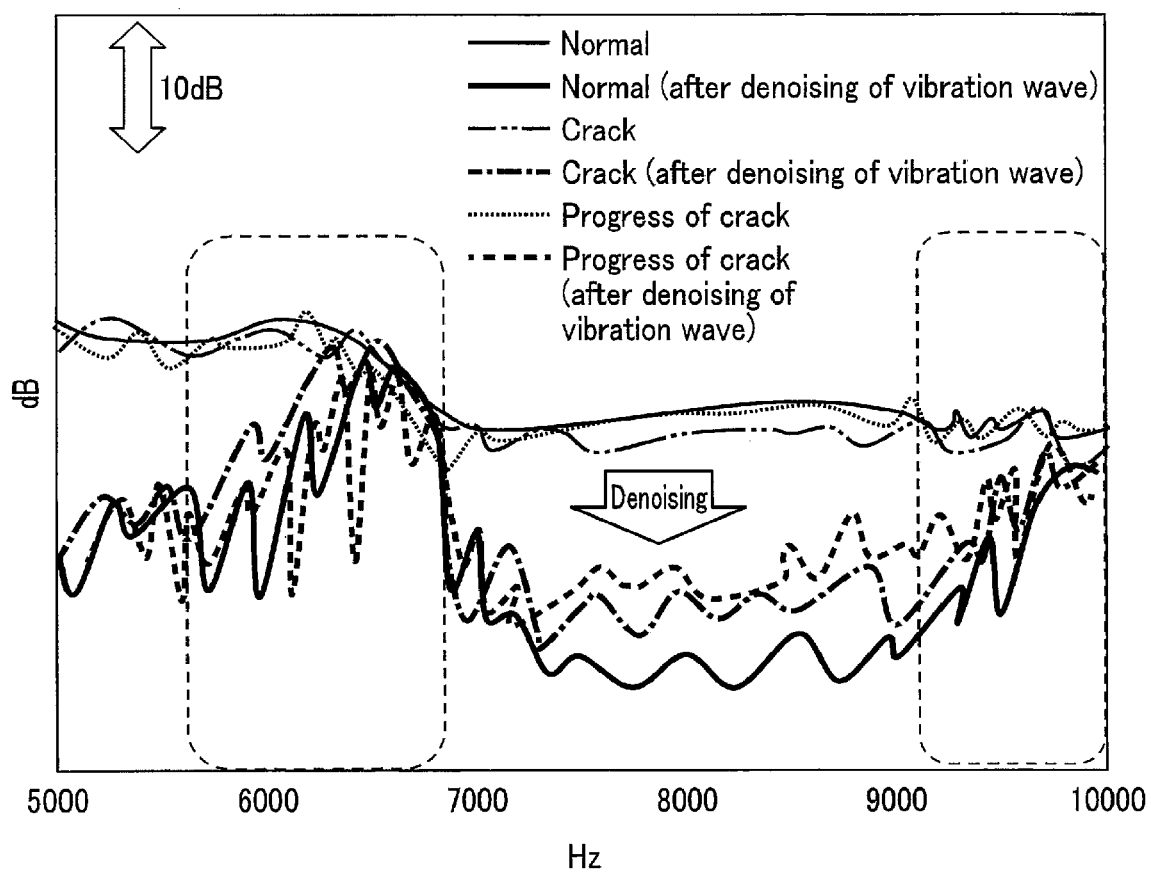
FIG. 9 is a graph showing the actual measurement results of frequency characteristics before and after denoising of a vibration sound after the acoustic inspection apparatus of the second embodiment emits the vibration sound to an inspection target object including a crack and collects a radiated sound from the crack.

FIG. 9 shows the actual measurement results of frequency characteristics before and after denoising of a vibration sound after the acoustic inspection apparatus of the second embodiment emits the vibration sound to an inspection target object including a crack and collects a radiated sound from the crack. The frequency characteristic before denoising indicates almost the same characteristic with respect to a normal state, a crack, and the progress of the crack. The frequency characteristic before denoising corresponds to the characteristic of the vibration sound. On the other hand, in the frequency characteristic after denoising, the characteristic of the vibration radiated sound appears by denoising the vibration sound. In a band near 7 kHz to 9 kHz in FIG. 9, there exists a level difference of 10 dB. The band near 7 kHz to 9 kHz is a reliable section. On the other hand, a band in a broken line frame is a band in which there is no level difference of 10 dB. In this band, the vibration radiated sound is unwantedly denoised along with denoising of the vibration sound. This band is desirably not used for abnormal state determination.

Figure 10B:
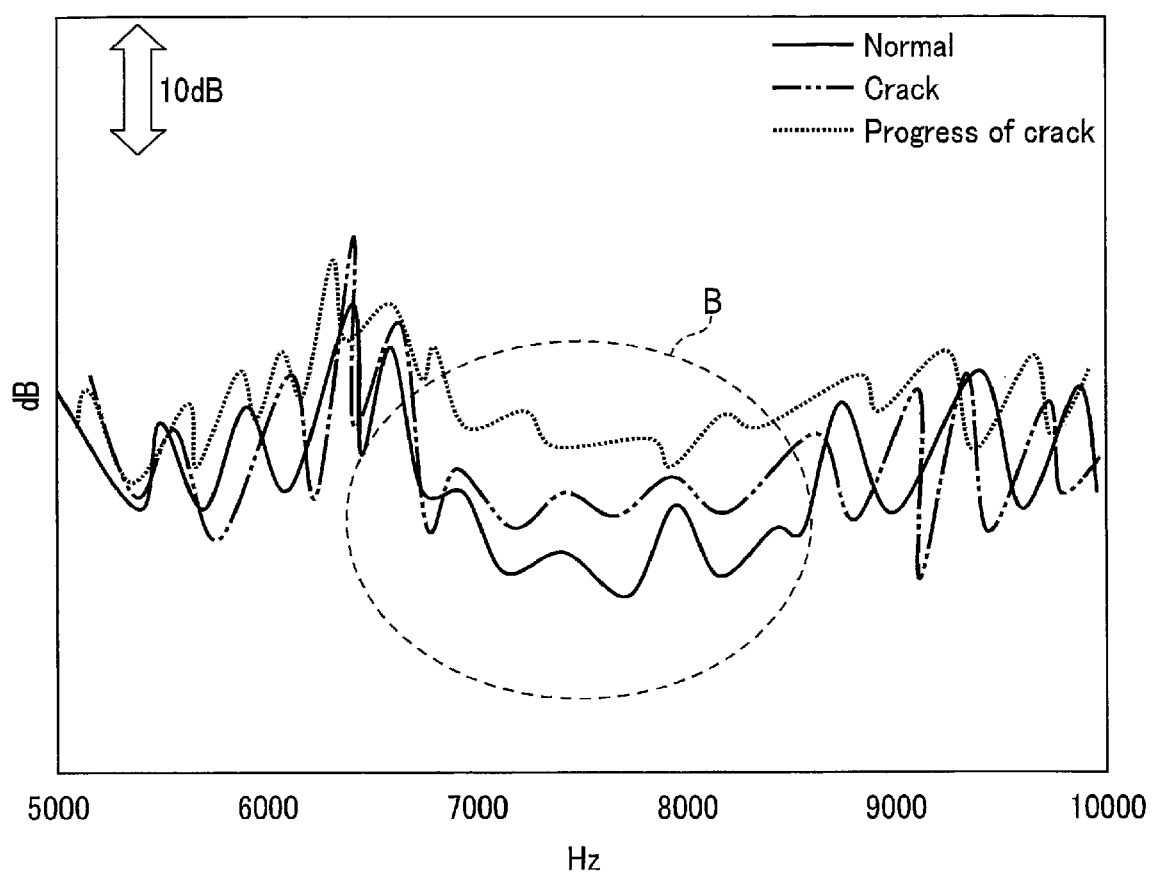
FIG. 10B is a graph showing the actual measurement result of the frequency characteristic when the vibration sound is denoised in another time width based on the collected radiated sound.

FIGS. 10A and 10B each show the actual measurement result of the frequency characteristic when the vibration sound is denoised in a different denoising time width based on the collected radiated sound. A band A in FIG. 10A is a band in which there is a level difference of 10 dB. Therefore, this band can be used for abnormal state determination. However, in the band. A in FIG. 10A, there is no difference between the normal state and the crack. That is, the example of FIG. 10A indicates that the component of the vibration radiated sound is hardly included at a time included in the denoising time width. On the other hand, a band B in FIG. 10B is also a band in which there is a level difference of 10 dB. Therefore, this band can be used for abnormal state determination. Then, it is found that there is a difference between the normal state and the crack in the band B in FIG. 10B. As described above, by adjusting the denoising time width in accordance with the microphone interval, it is possible to appropriately extract only the component of the vibration radiated sound.

Figure 11:
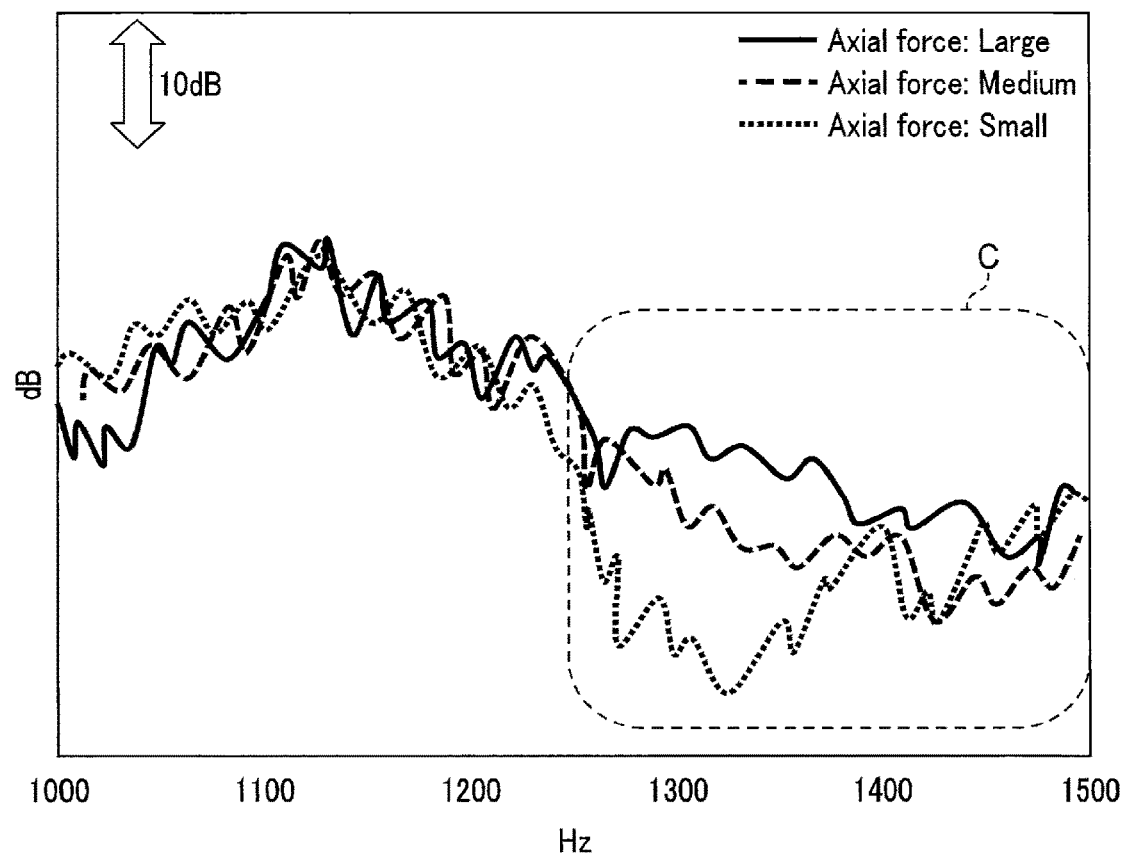
FIG. 11 is a graph showing the actual measurement result when the axial force is reduced.

FIG. 11 shows the actual measurement result when the axial force is reduced, instead of the crack. It is found that a difference in frequency characteristic caused by a difference in axial force appears in the band indicated by the broken line frame C due to a change of the vibration radiated sound.

Figure 12:
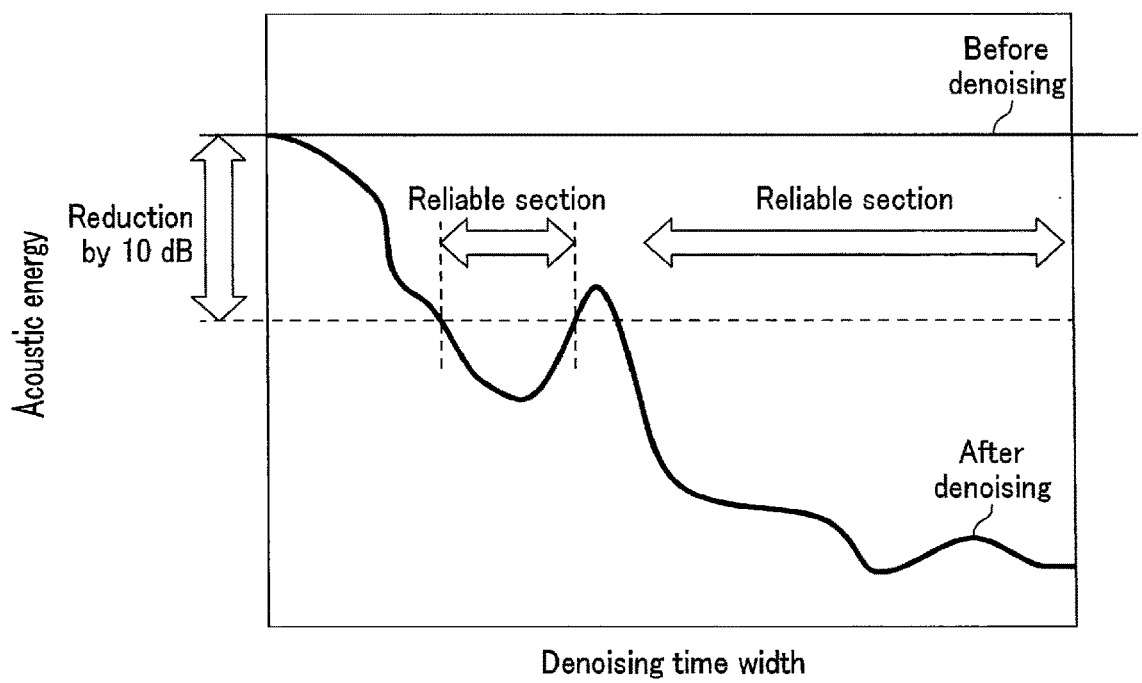
FIG. 12 is a graph for explaining a reliable section of a denoising time width.

In the second embodiment, assume that the reliable section is a reliable section in the frequency band. In addition, the reliable section may include a reliable section of the denoising time width. FIG. 12 is a graph for explaining the reliable section of the denoising time width. The abscissa in FIG. 12 represents the denoising time width and the ordinate in FIG. 12 represents the average acoustic energy of the entire region after denoising is performed within the range of the abscissa. In addition, a fine line in FIG. 12 indicates the average acoustic energy for each time width before denoising, and a thick line in FIG. 12 indicates the average acoustic energy for each time width after denoising. Note that the average acoustic energy for each time width before denoising has a constant value since no denoising is performed. Furthermore, as described above, as the denoising time width is smaller, denoising is performed only in the periphery of the initial impulse peak in the impulse response. On the other hand, as the denoising time width is larger, denoising is performed even for the component of a subsequent reverberation wave in the impulse response. At this time, with respect to the denoising time width in which the difference in average acoustic energy before and after denoising is equal to or smaller than 10 dB, the vibration radiated sound is highly probably denoised in addition to the vibration sound. Therefore, as shown in FIG. 12, a time width in which the difference in average acoustic energy before and after denoising is equal to or larger than 10 dB may also be set as a reliable section. In this case, the reliable section extracting unit 1046 may be configured to output, to the average energy calculation unit 1044, only the frequency characteristic for which denoising is performed in the denoising time width of the reliable section.

The reliable section extracting unit 1046 may further determine the reliable section of the denoising time width after determining the reliable section of the frequency band. The reliable section extracting unit 1046 may determine the reliable section of the denoising time width without determining the reliable section of the frequency band.

In the second embodiment, the two second microphones are provided. Three or more second microphones may be arranged to have different intervals. Accordingly, three or more impulse response calculation units and denoising units may be provided. The numbers of frequency conversion units, reliable section extracting units, and average energy calculation units may be equal to the number of second microphones.

Third Embodiment

The third embodiment will be described next. FIG. 13 is a view showing an example of the arrangement of an acoustic inspection apparatus according to the third embodiment. The acoustic inspection apparatus according to the third embodiment includes a vibration sound source 101, a speaker group, delay circuits 108a and 108b, a microphone group, a processor 104, a memory 105, and a display 106. The third embodiment will mainly describe portions different from the second embodiment. In the third embodiment, a description of portions similar to those in the second embodiment will be omitted or simplified.

In the third embodiment, instead of the one speaker 102, three speakers 102a, 102b, and 102c are arranged. The three speakers 102a, 102b, and 102c are speakers arranged to have intervals in the emission direction of a vibration sound. Referring to FIG. 13, the speakers 102a, 102b, and 102c are arranged at positions close to an inspection target object O in the order named. When the three speakers are arranged, it is expected that the exciting force of a vibration radiated sound is high. Note that the number of speakers is three in FIG. 13 but may be two or four or more.

The delay circuit 108a delays the emission timing of a vibration sound in the speaker 102b. The delay circuit 108b delays the emission timing of a vibration sound in the speaker 102c. Each of the delay circuits 108a and 108b may be, for example, a delay circuit for delaying an acoustic vibration signal from the vibration sound source 101.

In the third embodiment, the microphone group includes a first microphone 103a and a second microphone 103b. Similar to the second embodiment, the microphone group may include a first microphone 103a and second microphones 103b and 103c.

The processor 104 according to the third embodiment operates as an impulse response calculation unit 1041, a denoising unit 1042, a frequency conversion unit 1043, reliable section extracting unit 1046, a notch determination unit 1047, a correction unit 1048, an average energy calculation unit 1044, and an abnormal state determination unit 1045 by executing, for example, an acoustic inspection program stored in the memory 105.

The impulse response calculation unit 1041 calculates an impulse response between the first microphone 103a and the second microphone 103b based on the first sound pressure level based on an acoustic signal collected via the first microphone 103a and the second sound pressure level based on an acoustic signal collected via the second microphone 103b.

The denoising unit 1042 extracts a component of a vibration radiated sound along with the vibration of the inspection target object O by denoising a component of a vibration sound from the impulse response calculated by the impulse response calculation unit 1041.

The frequency conversion unit 1043 converts the impulse response output from the denoising unit 1042 into a frequency characteristic. Furthermore, the frequency conversion unit 1043 also converts the impulse response calculated by the impulse response calculation unit 1041 into a frequency characteristic.

The reliable section extracting unit 1046 extracts a reliable section in the frequency characteristic converted by the frequency conversion unit 1043.

Based on the acoustic signal collected by the microphone, the notch determination unit 1047 determines a dead zone as a band in which a spatial interference notch occurs in the vibration sound.

Figure 14:
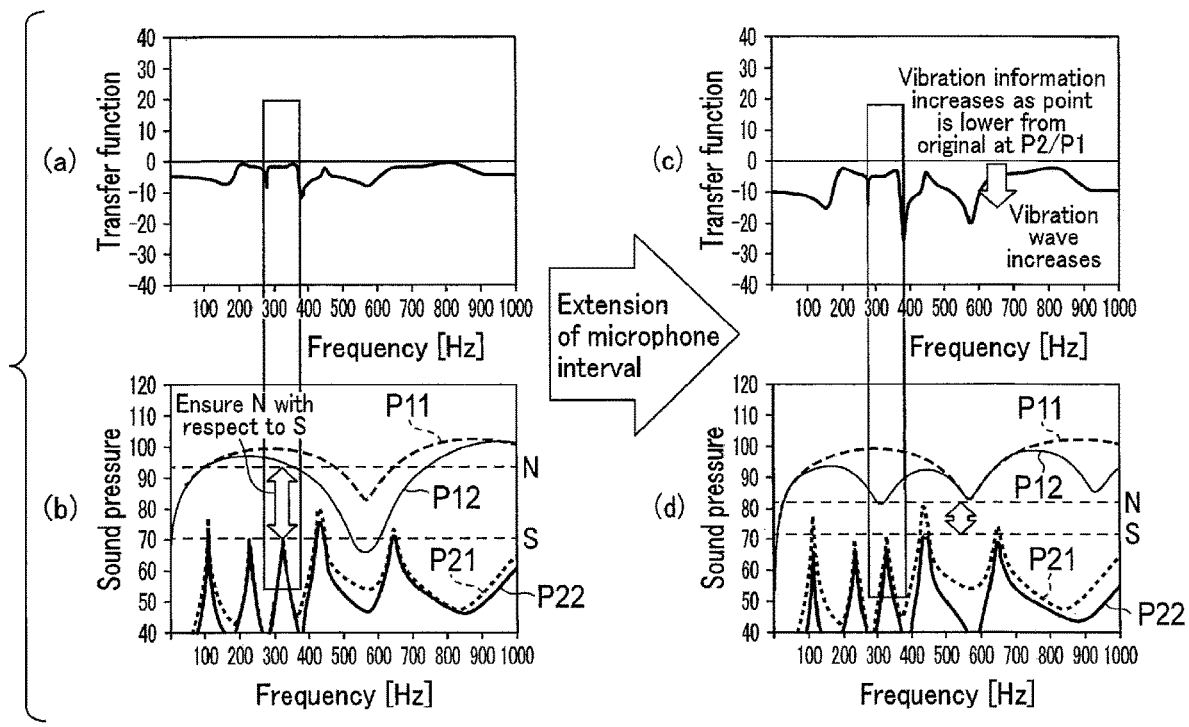
FIG. 14 is a view for explaining a spatial interference notch.

FIG. 14 is a view for explaining the spatial interference notch. In FIG. 14, (a) shows the characteristic of a transfer function between the first microphone 103a and the second microphone 103b with a predetermined microphone interval. In FIG. 14, (b) shows the frequency characteristics of sound pressures represented by the acoustic signals collected by the first microphone 103a and the second microphone 103b with the microphone interval in (a) of FIG. 14. Reference symbol P11 denotes the sound pressure level of a vibration sound N collected by the first microphone 103a; P12, the sound pressure level of the vibration sound N collected by the second microphone 103b; P21, the sound pressure level of a vibration radiated sound S collected by the first microphone 103a; and P22, the sound pressure level of the vibration radiated sound S collected by the second microphone 103b. In FIG. 14, (a) shows the frequency characteristic of the transfer function between the first microphone 103a and the second microphone 103b with a microphone interval obtained by extending the microphone interval in (a). In FIG. 14, (d) shows the frequency characteristics of the sound pressures represented by the acoustic signals collected by the first microphone 103a and the second microphone 103b with the microphone interval in (c) of FIG. 14.

As is apparent from comparison between (a) and (c) of FIG. 14, the change of the transfer function becomes large by extending the microphone interval. The sound pressure level of the vibration sound in a partial band decreases due to the influence of the spatial interference notch caused by interference between the two microphones. In the band in which the sound pressure level of the vibration sound decreases, a difference in gain before and after denoising of the vibration sound is highly probably smaller than 10 dB. As is apparent from comparison between (b) and (d) of FIG. 14, the decrease of the sound pressure level of the vibration sound caused by the spatial interference notch becomes larger by extending the microphone interval.

Figure 15:
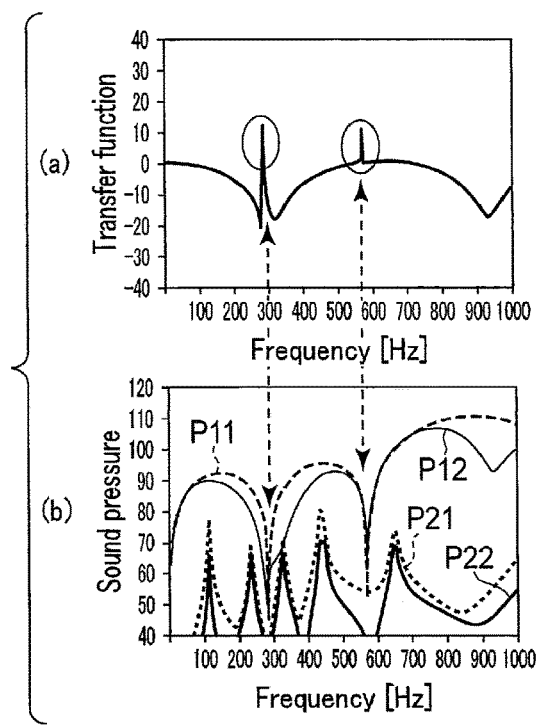
FIG. 15 is a view showing a difference in sound pressure level appearing in a transfer function due to delay processing.

In the third embodiment, the exciting force of the vibration radiated sound is improved using the plurality of speakers 102a, 102b, and 102c. At this time, the delay circuits 108a and 108b each delay the emission timing of the vibration sound so that the amplitudes and phases of the vibration rounds arriving at the first microphone 103a from the speakers coincide each other. A difference between the sound pressure levels of the two microphones is generated, as indicated by a round frame in (a) of FIG. 15, in a specific band in the frequency characteristic of the transfer function of the vibration sound between the first microphone 103a and the second microphone 103b. The band, indicated by the round frame, in which the difference between the sound pressure levels is generated coincides with a band in which the spatial interference notch of the vibration sound occurs. The notch determination unit 1047 receives, from the impulse response calculation unit 1041, the acoustic signals collected by the first microphone 103a and the second microphone 103b after the delay circuits 108a and 108b each perform delay processing, calculates the transfer function of the vibration sound from the received acoustic signals, and detects the peak in the transfer function, thereby determining a dead zone as the band in which the spatial interference notch occurs.

Figure 16:
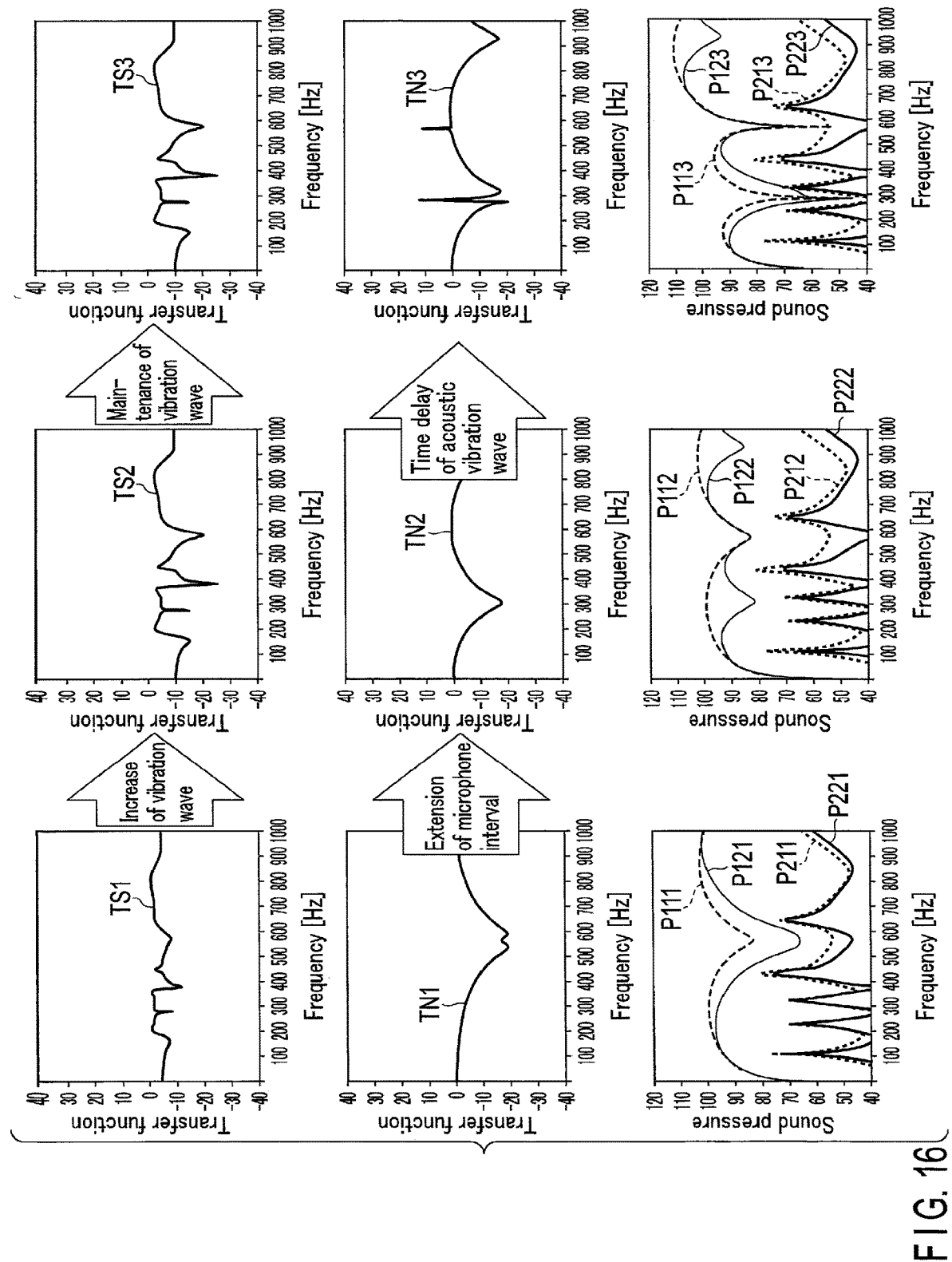
FIG. 16 is a view showing a result of expressing, as the frequency characteristic of the transfer function, by the delay processing of a vibration sound, the existence of a spatial interference notch appearing when a microphone interval is extended.

FIG. 16 shows a result of expressing, in the frequency characteristic of the transfer function, by the delay processing of the vibration sound, the existence of the spatial interference notch appearing when a microphone interval is extended. In FIG. 16, reference symbol TS1 denotes the frequency characteristic of the transfer function of the vibration radiated sound S when the microphone interval is set to the first microphone interval. In FIG. 16, reference symbol TN1 denotes the frequency characteristic of the transfer function of the vibration sound N when the microphone interval is set to the first microphone interval. In FIG. 16, reference symbol P111 denotes the sound pressure level of the vibration sound N collected by the first microphone 103a when the microphone interval is set to the first microphone interval; P121, the sound pressure level of the vibration sound N collected by the second microphone 103b when the microphone interval is set to the first microphone interval; P211, the sound pressure level of the vibration radiated sound S collected by the first microphone 103a when the microphone interval is set to the first microphone interval; and P221, the sound pressure level of the vibration radiated sound S collected by the second microphone 103b when the microphone interval is set to the first microphone interval. Furthermore, in FIG. 16, reference symbol TS2 denotes the frequency characteristic of the transfer function of the vibration radiated sound S when the microphone interval is set to the second microphone interval larger than the first microphone interval. In FIG. 16, reference symbol TN2 denotes the frequency characteristic of the transfer function of the vibration sound N when the microphone interval is set to the second microphone interval. In FIG. 16, reference symbol P112 denotes the sound pressure level of the vibration sound N collected by the first microphone 103*a* when the microphone interval is set to the second microphone interval; P122, the sound pressure level of the vibration sound N collected by the second microphone 103*b* when the microphone interval is set to the second microphone interval; P212, the sound pressure level of the vibration radiated sound S collected by the first microphone 103*a* when the microphone interval is set to the second microphone interval; and P222, the sound pressure level of the vibration radiated sound S collected by the second microphone 103*b* when the microphone interval is set to the second microphone interval. Furthermore, in FIG. 16, reference symbol TS3 denotes the frequency characteristic of the transfer function of the vibration radiated sound S when the microphone interval is set to the second microphone interval and the delay processing is performed. In FIG. 16, reference symbol TN3 denotes the frequency characteristic of the transfer function of the vibration sound N when the microphone interval is set to the second microphone interval and the delay processing is performed. In FIG. 16, reference symbol P113 denotes the sound pressure level of the vibration sound N collected by the first microphone 103*a* when the microphone interval is set to the second microphone interval and the delay processing is performed; P123, the sound pressure level of the vibration sound N collected by the second microphone 103*b* when the microphone interval is set to the second microphone interval and the delay processing is performed; P213, the sound pressure level of the vibration radiated sound S collected by the first microphone 103*a* when the microphone interval is set to the second microphone interval and the delay processing is performed; and P223, the sound pressure level of the vibration radiated sound S collected by the second microphone 103*b* when the microphone interval is set to the second microphone interval and the delay processing is performed. As is apparent from comparison between the transfer functions TS2 and TS3, with respect to the vibration radiated sound, the characteristic does not change in accordance with the presence/absence of the delay processing. On the other hand, as is apparent from comparison between the transfer functions TN2 and TN3, with respect to the vibration sound, the peak occurs in the band of the spatial interference notch due to the delay processing.

Figure 17:
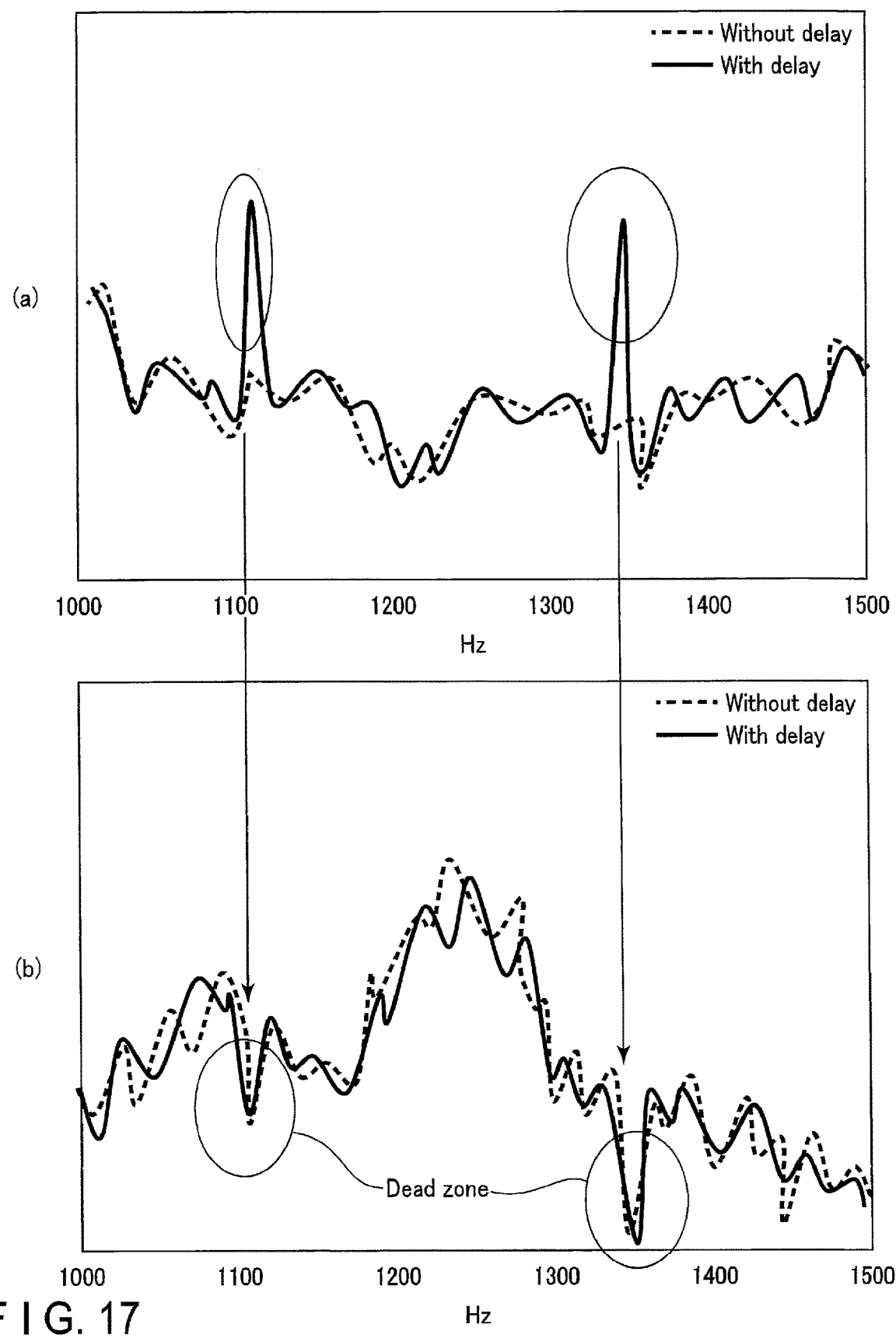
FIG. 17 is a view showing the actual measurement result of actually separating two speakers from each other by 20 cm, and delaying the emission timing of a vibration sound by the distance so that vibration sounds have the same phase at the first microphone installed at a position of 2.5 cm from an inspection target object.

FIG. 17 shows the actual measurement result of actually separating two speakers from each other by 20 cm, and delaying the emission timing of the vibration sound by the distance so that the vibration sounds have the same phase at the first microphone 103*a* installed at a position of 2.5 cm from the inspection target object O. In FIG. 17, (a) shows the characteristic of the transfer function of the vibration sound when the distance between the microphones is increased by 10 cm. As shown in (a) of FIG. 17, the peak is outstanding depending on the presence/absence of delay. In FIG. 17, (b) shows the frequency characteristic of the impulse response after denoising of the vibration sound. A band corresponding to the peak in the transfer function of the vibration sound is a dead zone in which the sound pressure level significantly decreases due to spatial interference. In the dead zone, the characteristic of the vibration radiated sound also degrades after denoising of the vibration sound. Therefore, by excluding the characteristic of the dead zone at the time of calculating the average acoustic energy, the determination accuracy of an abnormal state is improved.

The correction unit 1048 corrects the frequency characteristic to be used to calculate the average acoustic energy by the average energy calculation unit 1044. For example, the correction unit 1048 denoises the band in which the spatial interference notch occurs.

The average energy calculation unit 1044 calculates the average acoustic energy based on the frequency characteristic extracted by the reliable section extracting unit 1046 and corrected by the correction unit 1048.

Figure 18:
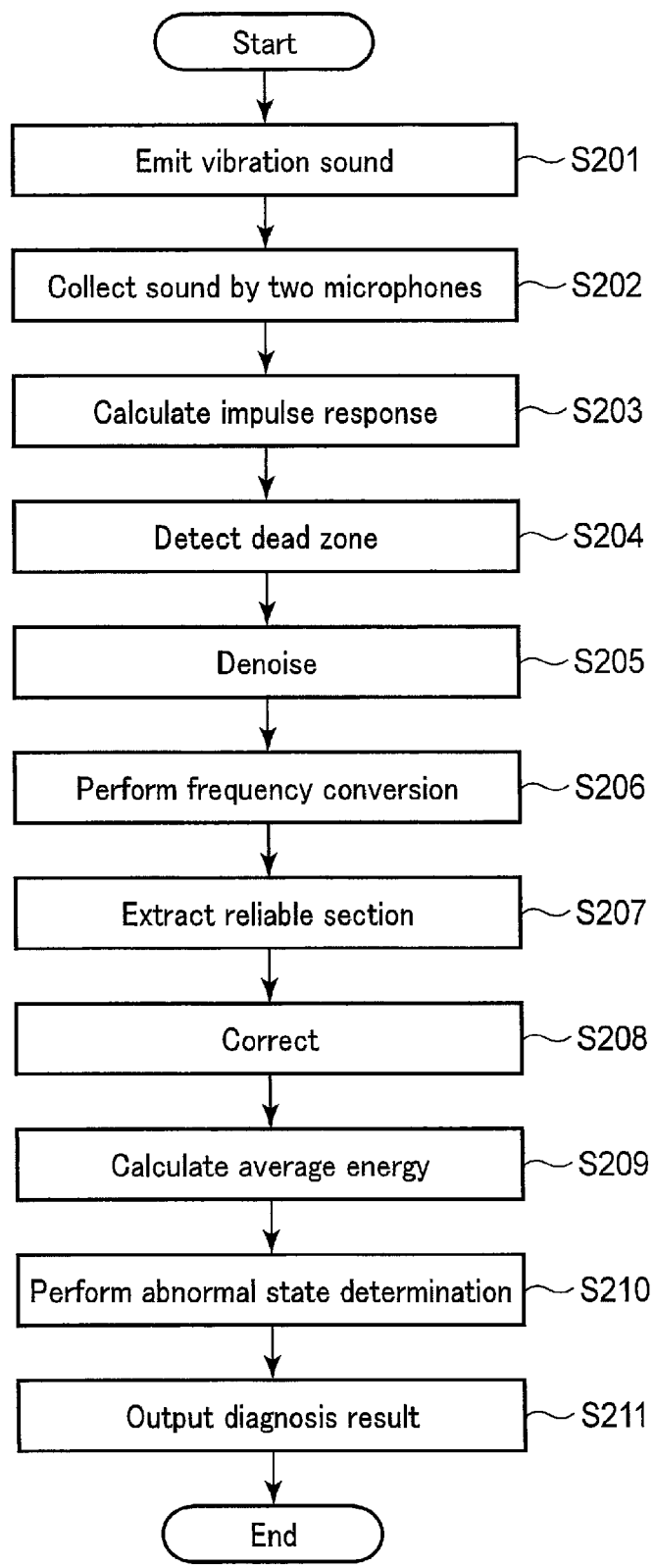
FIG. 18 is a flowchart illustrating the operation of the acoustic inspection apparatus according to the third embodiment.

FIG. 18 is a flowchart illustrating the operation of the acoustic inspection apparatus according to the third embodiment. Processing shown in FIG. 18 is mainly executed by the processor 104.

In step S201, the vibration sound source 101 emits a vibration sound to the inspection target object O. At this time, the delay circuits 108*a* and 108*b* delay the emission timings of the speakers 102*b* and 102*c* so that vibration sounds emitted from the speakers 102*a*, 102*b*, and 102*c* are collected by the first microphone 103*a* at the same phase.

In step S202, the first microphone 103*a* and the second microphone 103*b* collect the sound.

In step S203, the processor 104 calculates an impulse response between the first microphone 103*a* and the second microphone 103*b* based on the sound pressure levels of acoustic signals collected by the first microphone 103*a* and the second microphone 103*b*.

In step S204, the processor 104 detects a dead zone by calculating the transfer function of the vibration sound.

In step S205, the processor 104 denoises the component of the vibration sound from the calculated impulse response.

In step S206, the processor 104 converts each impulse response, from which the component of the vibration sound has been denoised, into a frequency characteristic by, for example, FFT. Furthermore, the processor 104 converts each impulse response before denoising of the component of the vibration sound into a frequency characteristic.

In step S207, the processor 104 extracts a reliable section by comparing the frequency characteristics before and after denoising.

In step S208, the processor 104 performs correction of denoising the band of the dead zone in the frequency characteristic.

In step S209, the processor 104 calculates the average acoustic energy between the first microphone 103*a* and the second microphone 103*b* using the gain in the corrected band.

In step S210, the processor 104 determines the presence/absence of the abnormal state in the inspection target object O and the degree of progress of the abnormal state by comparing the calculated average acoustic energy with the threshold.

In step S211, the processor 104 outputs, as the diagnosis result of the abnormal state, the determination result of the presence/absence of the abnormal state and the degree of progress of the abnormal state to, for example, the display 106.

As described above, according to the third embodiment, when a plurality of speakers emit vibration sounds to the inspection target object O, the exciting force of the vibration radiated sound is improved. Furthermore, when the vibration sounds emitted from the plurality of speakers undergo the delay processing so that they arrive at the first microphone 103*a* at the same phase, the dead zone in which a spatial interference notch occurs can be determined from the transfer function of the vibration sound. By denoising the band of the dead zone, the determination accuracy of the abnormal state is also improved.

In the third embodiment, the notch determination unit 1047 may control the delay processing by the delay circuits 108a and 108b so that the band in which spatial interference occurs becomes a specific band.

Furthermore, in the third embodiment as well, a plurality of second microphones having different microphone intervals may be arranged, similar to the second embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An acoustic inspection apparatus comprising:
a vibration sound source configured to emit a vibration sound to an inspection target object from at least one speaker;
a microphone group including a first microphone arranged near the inspection target object and configured to collect a radiated sound from the inspection target object, and at least one second microphone arranged to have an interval in an emission direction of the vibration sound with respect to the first microphone and configured to collect the radiated sound from the inspection target object; and
a processor including hardware and configured to
calculate a first impulse response between the first microphone and the second microphone based on a first sound pressure level collected via the first microphone and a second sound pressure level collected via the second microphone,
denoise a component corresponding to the vibration sound from the first impulse response,
convert, into a frequency characteristic, a second impulse response obtained by denoising the component corresponding to the vibration sound from the first impulse response,
calculate acoustic energy between the first microphone and the second microphone based on the frequency characteristic, and
determine presence/absence of an abnormal state of the inspection target object based on the acoustic energy.

2. The apparatus of claim 1, wherein the processor denoises a component of an impulse response corresponding to a time width according to the interval between the first microphone and the second microphone.

3. The apparatus of claim 2, wherein
the second microphone comprises at least two second microphones each having a different interval with respect to the first microphone, and
the processor is configured to
calculate a plurality of first impulse responses between the first microphone and the respective second microphones based on the first sound pressure level collected via the first microphone and the second sound pressure levels respectively collected via the second microphones, and
denoise components of the impulse responses corresponding to time widths according to the intervals between the first microphone and the respective second microphones.

4. The apparatus of claim 2, wherein the processor is configured to
extract a first reliable section as a band in which the denoising is performed with high reliability, based on a difference in gain between a first frequency characteristic as a frequency characteristic converted from the first impulse response and a second frequency characteristic as a frequency characteristic converted from the second impulse response, and
calculate the acoustic energy in the band of the first reliable section of the second frequency characteristic.

5. The apparatus of claim 4, wherein the processor is configured to extract, as the first reliable section, a band in which the difference in gain between the first frequency characteristic and the second frequency characteristic is not smaller than 10 dB.

6. The apparatus of claim 2, wherein the processor is configured to
extract a second reliable section as a time width in which the denoising is performed with high reliability, based on a difference in gain between first acoustic energy calculated based on a frequency characteristic before the denoising is performed and second acoustic energy calculated based on a frequency characteristic after the denoising is performed, and
calculate the acoustic energy based on the frequency characteristic for which the denoising is performed in the second reliable section.

7. The apparatus of claim 6, wherein the processor is configured to extract, as the second reliable section, a time width in which the difference in gain between the first acoustic energy and the second acoustic energy is not smaller than 10 dB.

8. The apparatus of claim 1, wherein
the vibration sound source emits the vibration sound from at least two speakers arranged to have an interval in an emission direction of the vibration sound,
the apparatus further includes at least one delay circuit configured to delay an emission timing of the vibration sound from each speaker so that the vibration sounds from the respective speakers synchronize with each other, and
the processor is configured to
detect a peak appearing due to the delay in a transfer function calculated based on the first sound pressure level collected via the first microphone and the second sound pressure level collected via the second microphone, and
correct the frequency characteristic to be used to calculate the acoustic energy based on the peak.

9. An acoustic inspection method comprising:
emitting a vibration sound to an inspection target object from at least one speaker;
calculating a first impulse response between a first microphone arranged near the inspection target object and configured to collect a radiated sound from the inspection target object and a second microphone arranged to have an interval in an emission direction of the vibration sound with respect to the first microphone and configured to collect the radiated sound from the inspection target object, based on a first sound pressure level collected via the first microphone and a second sound pressure level collected via the second microphone;
denoising a component corresponding to the vibration sound from the first impulse response;
converting a second impulse response after the denoising into a frequency characteristic;
calculating acoustic energy between the first microphone and the second microphone based on the frequency characteristic; and
determining presence/absence of an abnormal state of the inspection target object based on the acoustic energy.

* * * * *